(12) United States Patent
Yasui et al.

(10) Patent No.: US 7,158,875 B2
(45) Date of Patent: Jan. 2, 2007

(54) MISFIRE DETECTION SYSTEM FOR INTERNAL COMBUSTION ENGINE

(75) Inventors: Yuji Yasui, Wako (JP); Masahiro Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/316,984

(22) Filed: Dec. 27, 2005

(65) Prior Publication Data

US 2006/0142926 A1 Jun. 29, 2006

(30) Foreign Application Priority Data

Dec. 28, 2004 (JP) .............................. 2004-381322

(51) Int. Cl.
*G01M 15/11* (2006.01)
*F02D 45/00* (2006.01)

(52) U.S. Cl. ..................... 701/111; 73/117.3

(58) Field of Classification Search ............... 701/111, 701/102; 73/116, 117.3; 123/406.56, 406.6
See application file for complete search history.

(56) References Cited

U.S. PATENT DOCUMENTS 5,452,604 A * 9/1995 Namiki et al. .............. 701/111
5,691,469 A 11/1997 Mezger et al.
5,841,025 A 11/1998 Remboski et al.
5,856,922 A 1/1999 Jehanno
2005/0241376 A1* 11/2005 Miyata et al. ............. 73/117.3

FOREIGN PATENT DOCUMENTS

| EP | 0 662 608 A2 | 7/1995 |
| EP | 0 892 262 A2 | 1/1999 |
| JP | 4-101071 A * | 4/1992 |
| JP | 5-180063 A | 7/1993 |

* cited by examiner

*Primary Examiner*—Hieu T. Vo
(74) *Attorney, Agent, or Firm*—Arent Fox PLLC

(57) ABSTRACT

In a misfire detection system for an internal combustion engine, a product is calculated at every predetermined crank angle by multiplying a value retrieved from a periodic function defined to model torque generation of individual cylinders synchronously with each combustion cycle, by a detected crank angle velocity, and the product is integrated over a predetermined interval to calculate an integral. The integral is then compared with a predetermined value and is detected whether misfire has occurred in one of the individual cylinders, thereby enabling to detect misfire even when misfire occurs successively in a multiple cylinder engine, identify the misfiring cylinders with good accuracy.

12 Claims, 20 Drawing Sheets

FIG. 16

|  | CYLINDER #1 | CYLINDER #2 | CYLINDER #3 | CYLINDER #4 |
|---|---|---|---|---|
| CASE 1 | NO MISFIRE | NO MISFIRE | NO MISFIRE | NO MISFIRE |
| CASE 2 | NO MISFIRE | NO MISFIRE | TORQUE 20% LOWERED | NO MISFIRE |
| CASE 3 | NO MISFIRE | NO MISFIRE | TORQUE 20% LOWERED | MISFIRED |
| CASE 4 | NO MISFIRE | MISFIRED | TORQUE 20% LOWERED | MISFIRED |
| CASE 5 | NO MISFIRE | NO MISFIRE | MISFIRED | MISFIRED |

MISFIRE DETECTION SYSTEM FOR INTERNAL COMBUSTION ENGINE

BACKGROUND OF THE INVENTION

1. Field of the Invention

This invention relates to a misfire detection system for an internal combustion engine.

2. Description of the Related Art

Japanese Laid-Open Patent Application Hei 5 (1993)-180063 teaches an engine misfire detection system that detects the angular velocity of the engine crankshaft, uses a bandpass filter to extract periodic variation in the angular velocity caused by misfire occurrence, and uses the extracted variation to discriminate whether the engine is misfiring.

In recent years, however, increasingly strict emission controls have created a need to improve misfire detection so as to better hold down increased HC (hydrocarbons) emissions and accelerated catalyst deterioration caused by misfire. Of particular note is that it is nowadays necessary not only to discriminate misfire occurrence but also to identify the cylinder in which it occurred. However, the periodicity of engine speed variation is the same between the case of one cylinder misfiring (single-cylinder misfire) and the case of two cylinders misfiring successively (successive two-cylinder misfire). Therefore, when misfire detection is performed based solely on periodic variation in the angular velocity of the crankshaft as in the case of the prior art, identification of the misfiring cylinder(s) requires various kinds of auxiliary processing for removing frequency components, such a peak holding, absolute value computation and averaging. As a result, much time is required for establishing the detection algorithm.

SUMMARY OF THE INVENTION

An object of this invention is therefore to overcome the foregoing drawback by providing a misfire detection system for an internal combustion engine that is of simple structure but can nevertheless detect misfire with good accuracy and can, even when misfire occurs successively in a multiple cylinder engine, identify the misfiring cylinders with good accuracy.

In order to achieve the object, this invention provides a system for detecting a misfire of an internal combustion engine having a plurality of cylinders, comprising: a crank angle sensor detecting a crank angle velocity at every predetermined crank angle; a calculator calculating a product at the every predetermined crank angle by multiplying a value retrieved from a periodic function defined to model torque generation of individual cylinders synchronously with each combustion cycle, by the detected crank angle velocity, and integrating the calculated product over a predetermined interval to calculate an integral of the product; and a misfire discriminator comparing the calculated integral with a predetermined value and detecting whether misfire has occurred in one of the individual cylinders based on a result of the comparison.

BRIEF DESCRIPTION OF THE DRAWINGS

The above and other objects and advantages of the invention will be more apparent from the following description and drawings in which:

FIG. 16 is an explanatory view showing conditions when simulating the misfire detection by using the configuration shown in FIG. 6;

DETAILED DESCRIPTION OF THE PREFERRED EMBODIMENT

A misfire detection system for an internal combustion engine according to a preferred embodiment of the present invention will now be explained with reference to the attached drawings.

Figure 1:
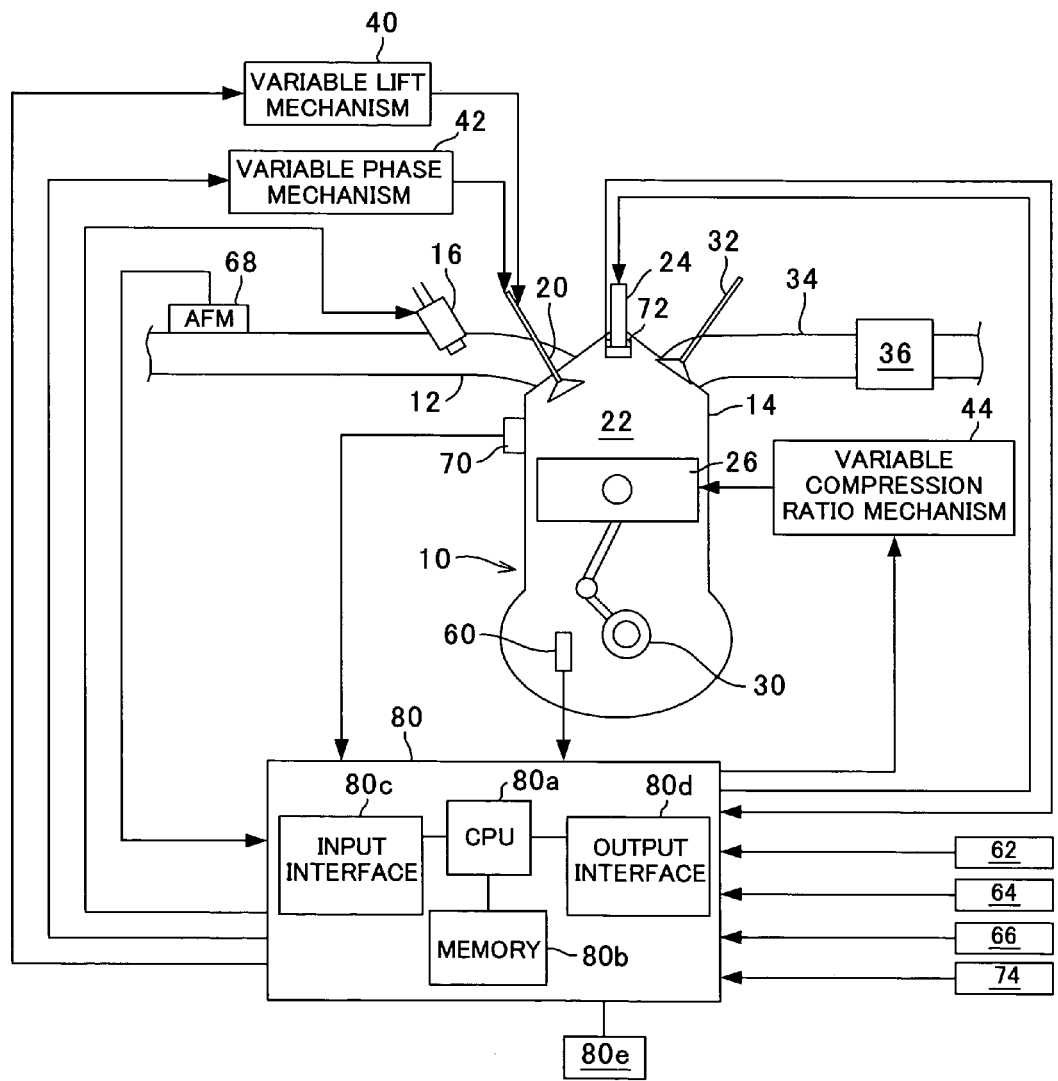
FIG. 1 is a schematic view showing a misfire detection system for an internal combustion engine according to a preferred embodiment of the invention.

FIG. 1 is a schematic diagram showing a misfire detection system for an internal combustion engine according to the preferred embodiment of the invention.

The symbol 10 in the drawing designates an internal combustion engine 10, specifically a four-cycle, four-cylinder, DOHC (double overhead cam), gasoline engine. The engine 10 is equipped with an air intake pipe 12. Air sucked into the air intake pipe 12 through an air cleaner (not shown) flows through an intake manifold (not shown). A fuel injector 16 is installed near the intake ports of each of the four cylinders 14 (only one shown). When energized, the injectors 16 inject fuel (gasoline) into the intake air. The ignition order (firing order) of the four cylinders is cylinder #1 (first cylinder) cylinder #3 (third cylinder), cylinder #4 (fourth cylinder) and cylinder #2 (second cylinder).

When the two intake valves (only one shown) 20 closing the intake ports of a cylinder open, the air-fuel mixture produced by the injection of fuel flows into combustion chamber 22 of the associated cylinder to be ignited by a spark plug 24. The resulting explosive combustion drives a piston 26 downward as viewed in the drawing to rotate a crankshaft 30. When the two exhaust valves (only one shown) 32 closing the exhaust ports of the cylinder open, the burnt gas (exhaust gas) produced by the combustion passes through an exhaust manifold and an exhaust system 34 connected thereto to be discharged to the exterior of the engine 10 after being purified by a catalytic converter 36.

The engine 10 is equipped with a variable lift mechanism 40 for variably regulating the lift or valve opening height of the intake valves 20, a variable phase mechanism 42 for variably regulating the phase relationship between an intake camshaft and exhaust camshaft that drive the intake valves 20 and exhaust valves 32 (thereby regulating the timing of valve opening and closing), and a variable compression ratio mechanism 44 for variably regulating the compression ratio by changing the top dead center (and bottom dead center) of the pistons 26.

The variable lift mechanism 40 will be explained first.

Figure 2:
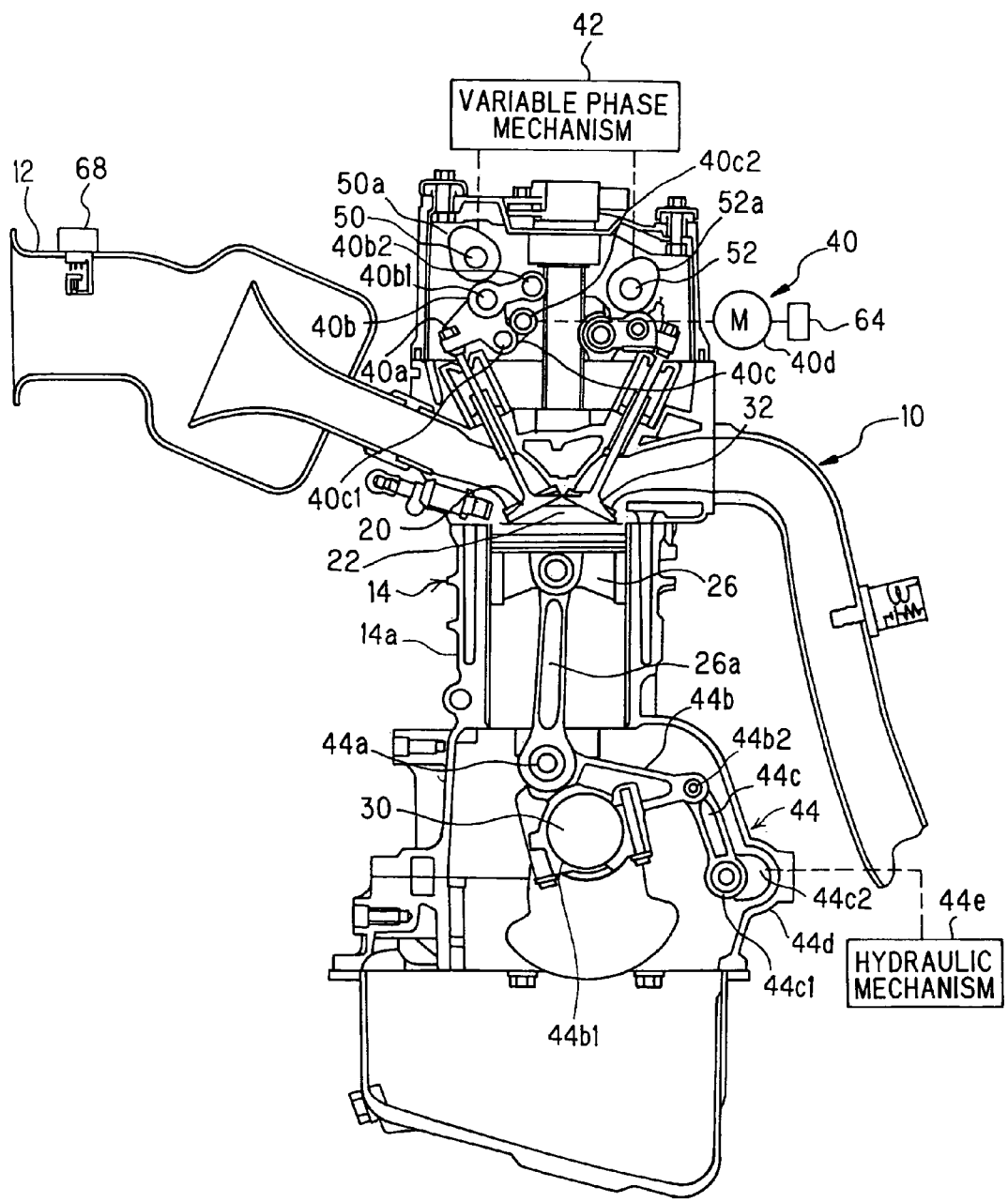
FIG. 2 is a side view showing the structure of the engine shown in FIG. 1 more concretely with focus on a valve mechanism.

FIG. 2 is a side view showing the structure of the engine 10 of FIG. 1 more concretely with focus on the valve mechanism. As illustrated, the intake camshaft (now assigned symbol 50) and the exhaust camshaft (now assigned symbol 52) are installed in parallel above the intake valves 20 and exhaust valves 32. They are connected to the crankshaft 30 through timing belts or the like (not shown) so that each is rotated at one-half the rotational speed of the crankshaft 30.

Intake cams 50a are attached to the intake camshaft 50. A rocker arm 40a is provided near each intake cam 50a with its one end in contact with the intake cam 50a and its other end in contact with the tip of the stem of the associated intake valve 20. An upper link arm 40b is connected to the rocker arm 40a by a link pin 40b1 and a lower link arm 40c is connected thereto by a link pin 40c1. The upper link arm 40b is fastened to the cylinder block 14a by another link pin 40b2.

Another link pin 40c2 of the lower link arm 40c is connected to a movable shaft (control shaft; not shown) lying parallel to the crankshaft 30. The movable shaft is connected to an electric motor 40d through reduction gearing (not shown). Rotation of the movable shaft by the motor 40d via the reduction gearing moves the center of rotation where the line connecting link pins 40b1, 40b2 of the upper link arm 40b and the line connecting the link pins 40c1, 40c2 of the lower link arm 40c intersect, thereby changing the distance between the intake cam 50a and rocker arm 40a to change or regulate the amount of lift of the intake valve 20.

The variable phase mechanism 42 will be explained next. The variable phase mechanism 42 is connected to the intake camshaft 50.

Figure 3:
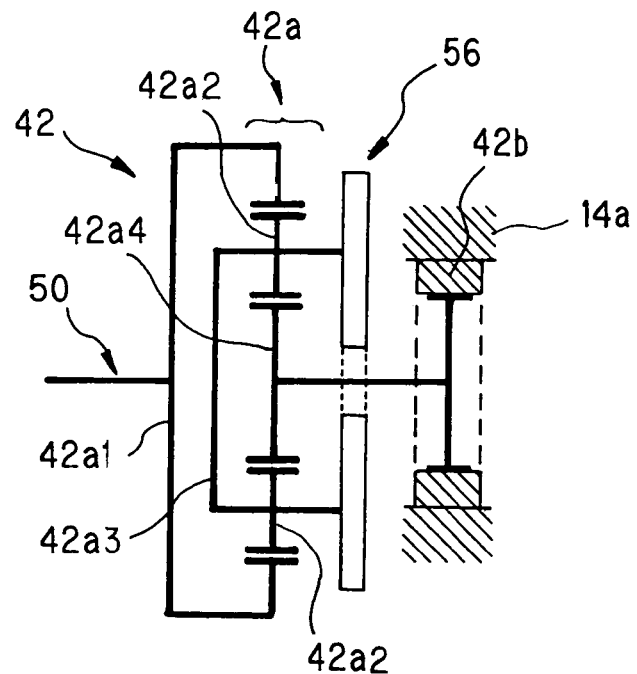
FIG. 3 is a schematic side view showing a variable phase mechanism shown in FIG. 1.
Figure 4:
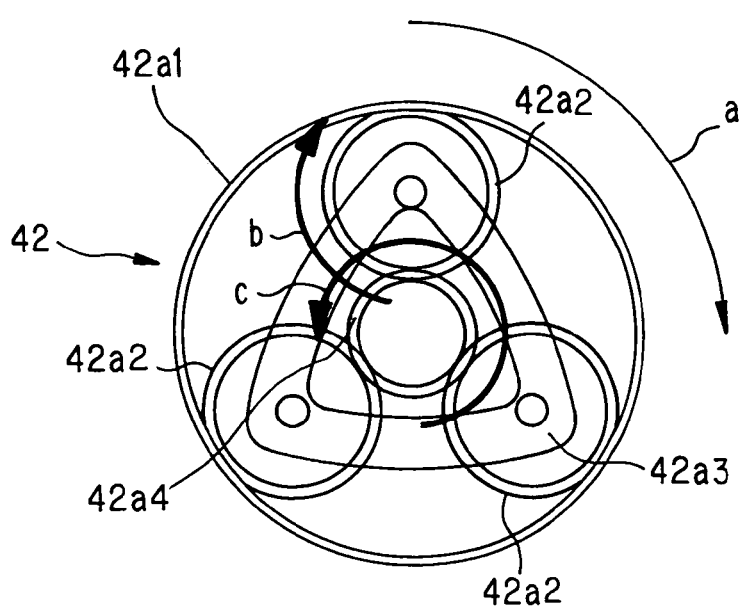
FIG. 4 is a front view showing the variable phase mechanism shown in FIG. 3.

The variable phase mechanism 42 is shown schematically in FIG. 3. A front view of the mechanism is shown in FIG. 4. The structure of an electromagnetic brake thereof is shown schematically in FIG. 5.

The variable phase mechanism 42 is equipped with a planetary gear system 42a and an electromagnetic brake 42b fastened to the cylinder block 14a. A ring gear 42a1 of the planetary gear system 42a is fastened to the intake camshaft 50. Three planetary pinions 42a2 mesh with the ring gear 42a1 at intervals of 120 degrees.

As best shown in FIG. 4, the three planetary pinions 42a2 are interconnected by a carrier 42a3 having the shape of an equilateral regular triangle in plan view and, as shown in FIG. 3, are connected through the carrier 42a3 to a sprocket 56 that is driven by the crankshaft 30. The carrier 42a3 is connected through a connector 42b1 of the electromagnetic brake 42b shown in FIG. 5 to one end of a return spring (compression spring) 42b2.

A sun gear 42a4 meshes with the three planetary pinions 42a2. The sun gear 42a4 is fastened to a connector 42b3 of the electromagnetic brake 42b shown in FIG. 5 and through the connector 42b3 to the other end of the return spring 42b2.

Figure 5:
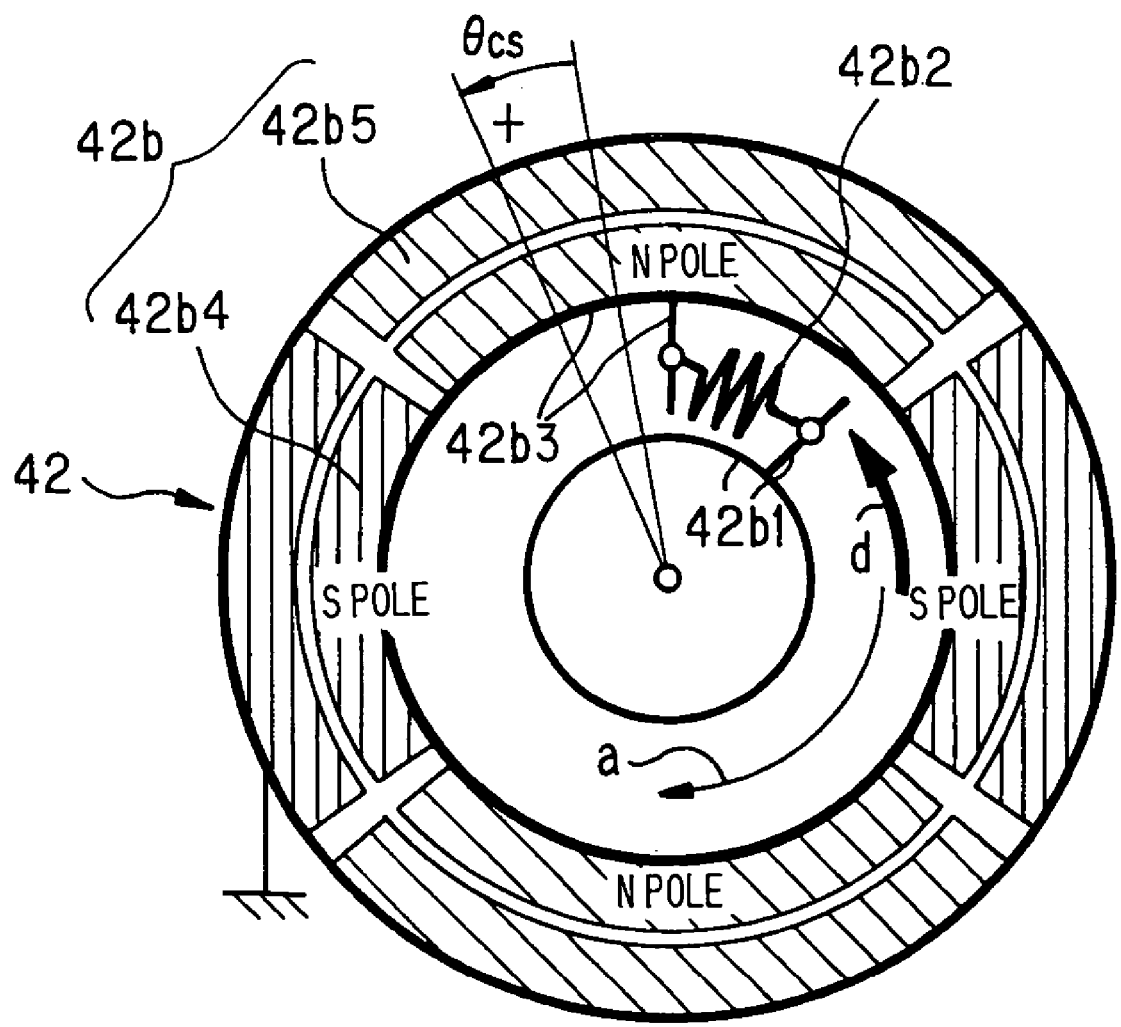
FIG. 5 is a front view showing the structure of an electromagnetic brake in the variable phase mechanism shown in FIG. 4.

As shown in FIG. 5, the electromagnetic brake 42b includes an annular permanent magnet 42b4 located on the outer periphery of the annular connector 42b3 to which the sun gear 42a4 is connected and an annular electromagnet 42b5 located on the outer periphery of the permanent magnet 42b4. The permanent magnet 42b4 has a bipolar structure composed of four magnetic pole pieces arranged with alternating north-south polarities.

The electromagnet 42b5 is composed of four conductors, i.e., laminated steel plates arranged in one-to-one correspondence with the four magnetic pole pieces. The conductors are wound with coils (not shown) that are applied with energizing current by an energizing circuit (not shown) to be magnetized in a polarity depending on the energization direction. Thus the electromagnetic brake 42b resembles a DC motor in structure.

The return spring 42b2 operates through the connectors 42b1, 42b3 to bias the sun gear 42a4 clockwise relative to the carrier 42a3 as viewed in FIG. 5. That is, the sun gear 42a4 is biased in the retard direction, specifically in the direction of retarding the opening (and closing) of the intake valves 20 relative to the rotation of the crankshaft 30.

In the variable phase mechanism 42 of the illustrated structure, the sprocket 56 is rotated one-half turn in the direction of the arrow a in FIG. 4 with rotation of the crankshaft 30. The rotation of the sprocket 56 is transmitted through the carrier 42a3 to the planetary pinions 42a2 to rotate them in the direction of the arrow b. As a result, the ring gear 42a1 and the intake camshaft 50 are rotated in the same direction as the direction of rotation of the sprocket 56 (direction of arrow a) and the sun gear 42a4 is rotated in the direction indicated by the arrow c in FIG. 4.

If at this time the electromagnet 42b5 is energized to brake the rotation of the permanent magnet 42b4 connected to the sun gear 42a4 through the connector 42b3, the intake camshaft 50 will be moved relative to the sprocket 56 in the advance direction indicated by the arrow d in FIG. 5 by an amount proportional to the braking force, thereby moving ahead or angularly advancing the contact point between the intake cam 50a and rocker arm 40a relative to the crank angle.

Therefore, when the sun gear 42a4 has rotated relatively by a certain angle to bring the braking force and the return spring force into equilibrium, the planetary pinions 42a2 stop operating, so that the sprocket 56 and intake camshaft 50 rotate unitarily while maintaining the certain angle therebetween. In other words, the cam phase is controlled in the advance and retard directions by increasing and decreasing the braking force. The phase, i.e., timing of valve opening and closing of the exhaust valves 32 is variably regulated (controlled) similarly by a variable phase mechanism 42 connected to the exhaust camshaft 52. Since the structure of this variable phase mechanism is basically the same as the variable phase mechanism 42, a detailed description will be omitted.

The variable compression ratio mechanism 44 will now be explained. As shown in FIG. 2, a first link 44b of substantially triangular shape in plan view is connected to a connecting rod 26a of the piston 26 by a link pin 44a.

The first link 44b is formed at a location eccentric or radially offset from the link pin 44a with a hole 44b1 for rotatably accommodating the crankshaft 30 and one end thereof is connected to a second link 44c by a link pin 44b2. A smaller-diameter link pin 44c1 provided at the tip of the second link 44c is eccentrically connected to a larger-diameter movable shaft (control shaft) 44c2 formed at the tip of a third link 44d fastened to the cylinder block 14a.

The movable shaft 44c2 is driven to rotate by a hydraulic mechanism 44e, thereby at each cylinder operating the four-joint linkage composed of the first link 44b, second link 44c and third link 44d so as to change the TDC (top dead center; and BDC bottom dead center) of the pistons 26 to variably regulate or control the compression ratio of the combustion chambers 22.

The explanation of FIG. 1 will be resumed. A crank angle sensor 60 installed near the crankshaft 30 outputs a cylinder discrimination signal for indicating the crankangle positions at the four cylinders 14, a TDC signal indicative of a position related to the TDC of the four pistons 26, and signals indicative of unit crank angles, for example, crank angle signals (CRK signals) produced every 15 degrees of crankshaft rotation.

A camshaft sensor 62 installed near the intake camshaft 50 (shown in FIG. 2) produces an output or signal every predetermined angle of rotation, e.g., one every one degree of rotation, of the intake camshaft 50. A lift sensor 64 constituted as rotary encoder or the like and installed near the reduction gearing of the motor 40d in the variable lift mechanism 40 produces an output or signal corresponding to the amount of lift or amount of valve opening Liftin of the intake valves 20 owing to the geared-down rotation of the motor 40d. A compression ratio sensor 66 installed near the hydraulic mechanism 44e in the variable compression ratio mechanism 44 uses the detected the stroke or amount of rotation of the hydraulic mechanism 44e to produce an output corresponding to the compression ratio Cr of the combustion chambers 22.

An airflow meter (AFM) 68 installed near the end of the air intake pipe 12 produces an output or signal corresponding to the intake air quantity Q. A water temperature sensor 70 installed near a coolant channel (not shown) of the cylinder 14 produces an output or signal indicative of the coolant temperature TW of the engine 10.

An accelerator position sensor 74 installed near the accelerator pedal (not shown) provided on the floor near the driver's seat of the vehicle (not shown) in which the engine 10 is mounted produces an output or signal corresponding to the accelerator opening or depression amount AP produced by the driver's depression of the accelerator pedal.

The outputs of the forgoing sensors are sent to an ECU (Electronic Control Unit) 80. As shown in the drawing, the ECU 80 is a microcomputer comprising a CPU 80a, memory 80b, input interface 80c and output interface 80d, and also including an A/D converter circuit, waveforming circuit, counter and other components that are not shown in the drawing. The ECU 80 is connected to an MIL (Malfunction Indicator Lamp) 80e.

The outputs of some sensors, including the crank angle sensor 60, are waveformed by the waveforming circuit, while the outputs of others, including the airflow meter 68, are converted to digital values by the A/D converter circuit. The ECU 80 detects or determines the engine speed NE by using the counter to count the CRK signals output by the crank angle sensor 60. In addition, it detects or determines the cam phase Cain (timing of the opening and closing of the intake valves 20) based on the CRK signals and the output of the camshaft sensor 62.

As will be explained further later, the ECU 80 uses the determined values and other sensor outputs to control the variable phase mechanism 42 and other variable mechanisms of the engine 10, as well as its fuel injection quantity and ignition timing.

Figure 6:
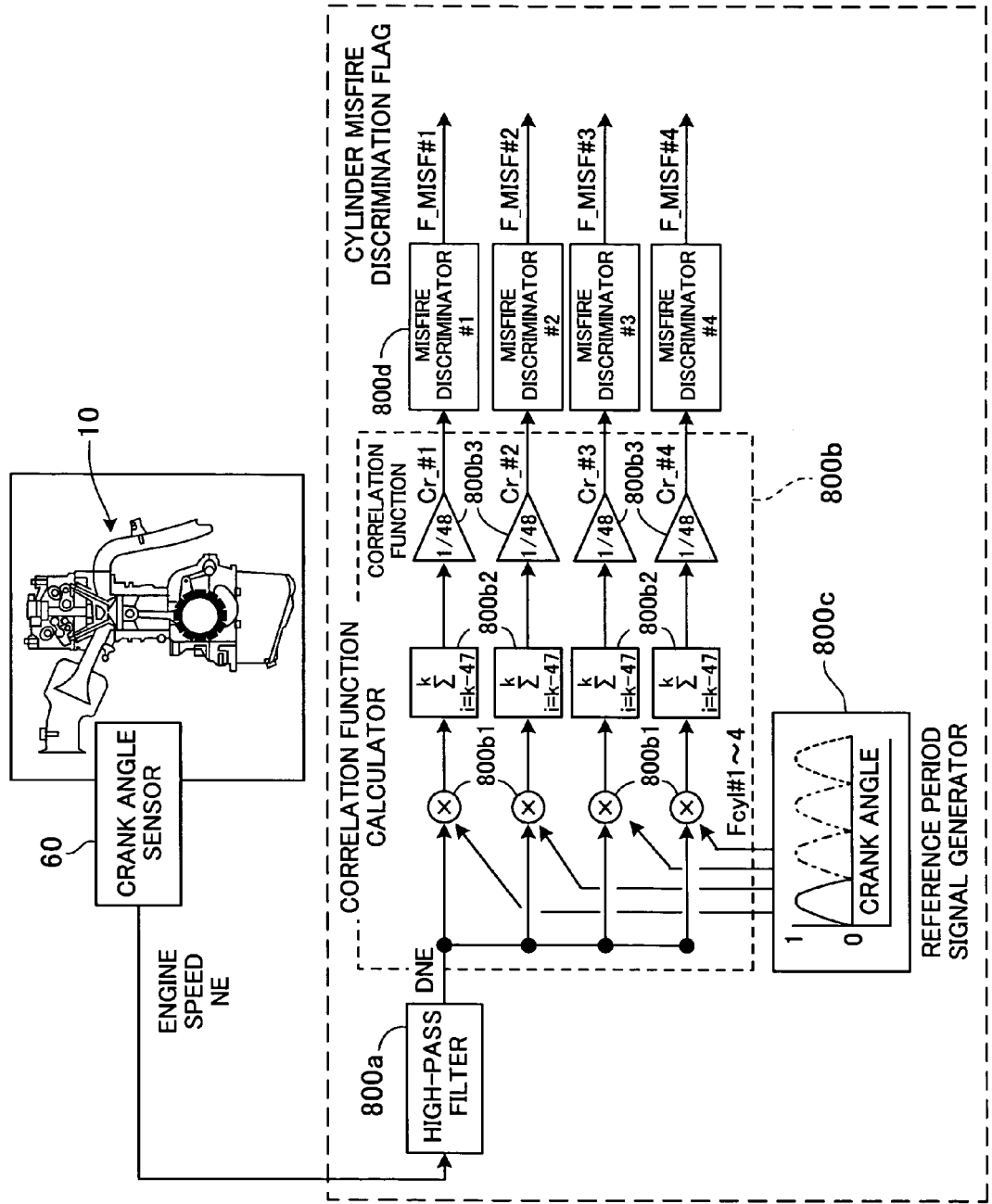
FIG. 6 is a block diagram functionally representing a misfire detection operation, which is one of the operations performed by an ECU shown in FIG. 1.

FIG. 6 is a block diagram functionally representing the misfire detection operation, which is one of the operations performed by the ECU 80.

Figure 22:
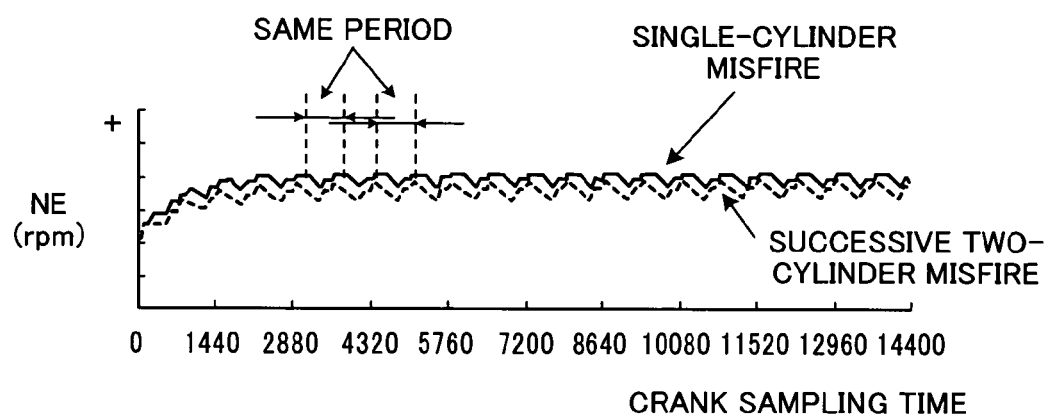
FIG. 22 is a graph showing results of simulation of misfire detection in the case of using the conventional system.

Explanation will be made with reference to this drawing after once again explaining the problem to be solved by the invention. As pointed out earlier, it has in recent years become necessary not only to discriminate misfire occurrence but also to identify the cylinder(s) in which it occurred. However, as shown in FIG. 22, the periodicity of engine speed variation is the same between the case of one cylinder misfiring (single-cylinder misfire) and the case of two cylinders misfiring successively (successive two-cylinder misfire). Therefore, when misfire detection is performed based solely on periodic variation in the angular velocity of the crankshaft as in the case of the reference, identification of the misfiring cylinder(s) requires various kinds of auxiliary processing. As a result, much time is required for establishing the detection algorithm.

In order to overcome this problem, the misfire detection system according to this embodiment is configured as shown in FIG. 6. As illustrated, the system is equipped with a high-pass 800a, correlation function calculator 800b, reference period signal generator 800c, and misfire discriminator 800d. Since the system detects misfire in the individual cylinders, each cylinder 14 is assigned a cylinder number i (i=1 to 4).

First, the high-pass filter 800a filters the engine speed NE detected from the CRK signals outputted by the crank angle sensor 60. Specifically, it performs the following subtraction to calculate the crank angular velocity DNE every predetermined crank angle (e.g., 15 degrees).

$$DNE(n) = NE(n) - NE(n-1) \quad (1-1)$$

where n: Sampling time synchronized with the crank angle (e.g., every 15 degrees)

Next, in order to model the torque generation of the individual cylinders synchronously with each combustion cycle of the engine 10 (crank angle of 720 degrees), the correlation function calculator 800b retrieves the period function Fcyl#i (hereinafter called "reference period signal") generated or defined in the reference period signal generator 800c every predetermined crank angle (e.g., 15 degrees) to obtain the value Fcyl#i and calculates the product of the obtained value and the calculated crank angular velocity DNE in a multiplier stage 800b1.

It then integrates the calculated product over one combustion cycle (predetermined crank angle interval) in an integrator stage 800b2 and calculates the moving average value of the result in a divider stage 880b3, thereby defining or calculating a correlation function Cr#i. These calculations are shown below. The multiplication sign is omitted throughout both the specification and the drawings.

$$Cr\#i(k) \Leftarrow Cr\#i'(n) \quad (1-2)$$
(Down sampling)

$$Cr\#i'(n) = \frac{1}{N} \sum_{j=n-N+1}^{n} DNE(i) Fcyl\#i(j) \quad (1-3)$$

where

N: Sampled data of one cycle (in the case of crank pulse produced every 15 degrees: N=48)

k: Sampling time corresponding to combustion cycle

Figure 7:
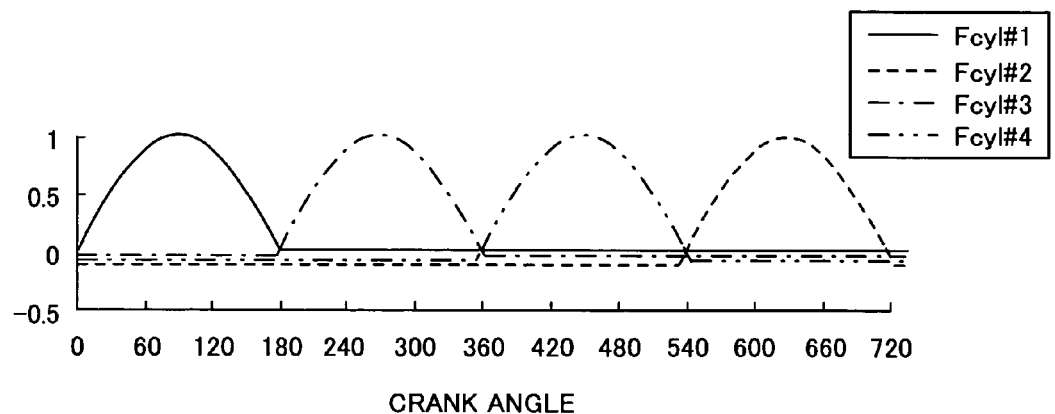
FIG. 7 is a graph showing the characteristics of a reference period signal Fcyl#i produced by a reference period signal generator shown in FIG. 6.

The characteristic of the reference period signal Fcyl#i is shown in FIG. 7. Since the torque variation or generation owing to combustion in each cylinder i and the crank angular velocity are correlated, the system of this embodiment retrieves the reference period signal Fcyl#i (periodic function) obtained by modeling torque generation at the individual cylinders over one combustion cycle and calculates the product of the obtained value and the crank angular velocity to detect misfire based on the correlation therebetween.

In addition, the system calculates the integral (i.e., correlation function Cr#i) of the product over a predetermined crank angle interval (predetermined interval) and calculates the moving average of the result to calculate the correlation function as a constant value removed of frequency components. This will be explained further. The correlation functions (mutual correlation functions) of the functions f1 and f2 of the correlation function Cr#i and the like shown in FIG. 6 are defined generally as follows.

$$F(k) = \frac{1}{N+1} \sum_{l=0}^{N} \{f1(l) f2(l)\} \quad (1-4)$$

where functions f1 and f2 here are defined as follows.

$$f1(k) = \sin(\omega k \Delta T)$$

$$f2(k) = \sin(\omega k \Delta T + 2\pi/6) \quad (1-5)$$

where N is defined as follows $$Tp = \frac{2\pi}{\omega} \neq N \Delta T \quad (1-6)$$

Figure 8:
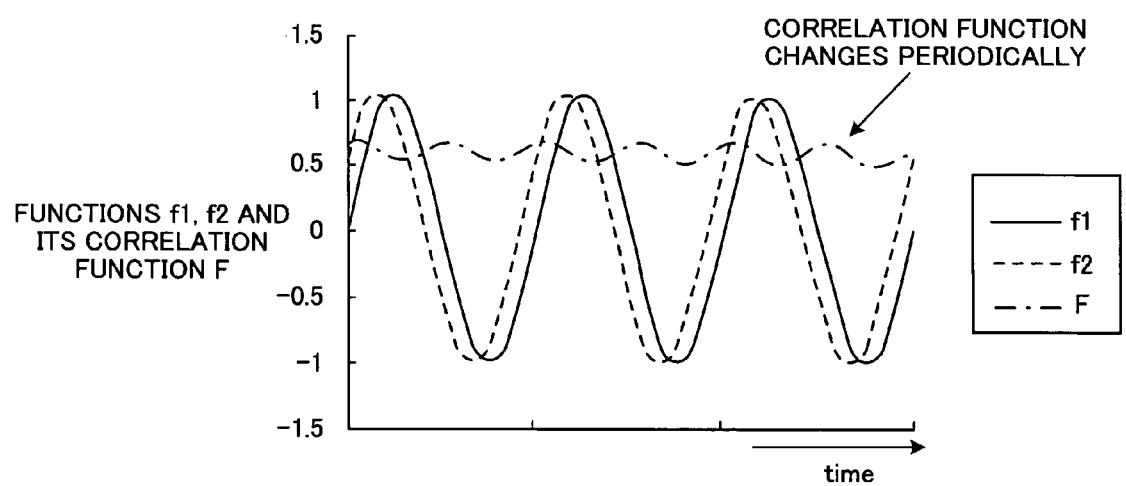
FIG. 8 is a graph generally showing a correlation function Cr#i shown in FIG. 6 with a correlation function F constituted of functions f1, f2, while showing a calculation result (simulation result) of the correlation function F in the case in which the calculation interval of the correlation function F is made different from the period of the functions f1, f2.

In the foregoing, when a correlation function is calculated with the period of the functions f1, f2 and the calculation interval of the correlation function F made different, the result is as shown in FIG. 8. As can be seen from FIG. 8, when the calculation interval of the correlation function F is made different from the period of the functions f1, f2, the correlation function varies periodically.

Figure 9:
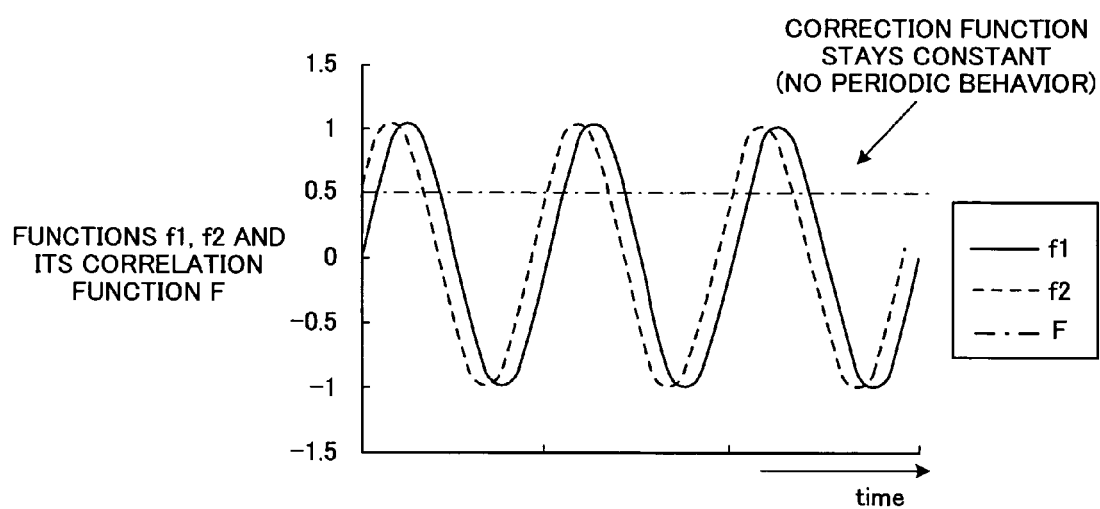
FIG. 9 is a similar graph generally showing the correlation function Cr#i shown in FIG. 6 with the correlation function F constituted of the functions f1, f2, while showing a calculation result (simulation result) of the correlation function F in the case in which the calculation interval of the correlation function F is made the same as the period of the functions f1, f2.

On the other hand, when the calculation interval of the correlation function F is made the same as the period of the functions f1, f2 as shown below, the result is as shown in FIG. 9.

$$Tp = \frac{2\pi}{\omega} = N \Delta T \quad (1-7)$$

As is clear from FIG. 9, when the calculation interval of the correlation function F is made the same as, or an integral multiple of, the period of the functions f1, f2, the correlation function F does not exhibit periodic behavior but stays at a constant value. This embodiment takes advantage of this property of the correlation function by setting the integration interval equal to one combustion cycle (crank angle of 720 degrees). As is clear from the foregoing, it is also possible to set the integration interval to n-times of the combustion cycle (n: integer not smaller than 2).

In the illustrated configuration, occurrence of misfire in each cylinder i is discriminated or detected in the misfire discriminator 800d by, as shown below, comparing the correlation function Cr#i and a discrimination threshold value (predetermined value) Cr_misf.

$$\begin{cases} F\_MISF\#i(k) = 1 \text{(misfire occurs)}: & Cr\#i(k) < Cr\_misf \quad (1-8) \\ F\_MISF\#i(k) = 0 \text{(normal combustion)}: & Cr\#i(k) \geq Cr\_misf \quad (1-9) \end{cases}$$

where
F_MISF#i: Cylinder misfire discrimination flag

In the configuration shown in FIG. 6, the operations of the correlation function calculator 800b and misfire discriminator 800d are performed in the CPU 80a of the ECU 80. Further, the reference period signal generator 800c corresponds to the memory 80b that stores the characteristics shown in FIG. 7.

The operation of the system shown in FIG. 6 will now be explained.

Figure 10:
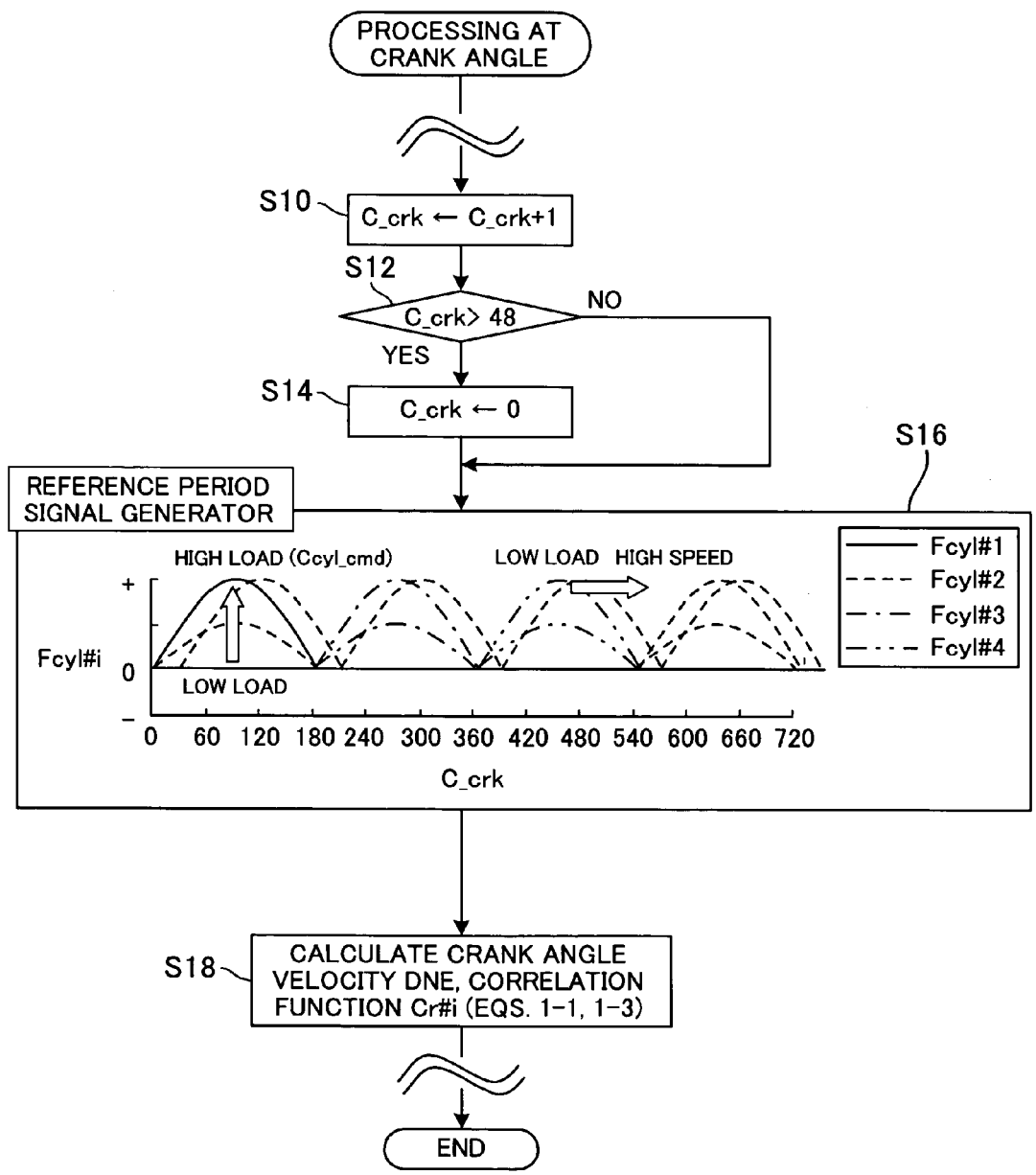
FIG. 10 is a flowchart showing the processing of calculating the correlation function Cr#i in the misfire detection operation executed by the ECU shown in FIG. 6.
Figure 11:
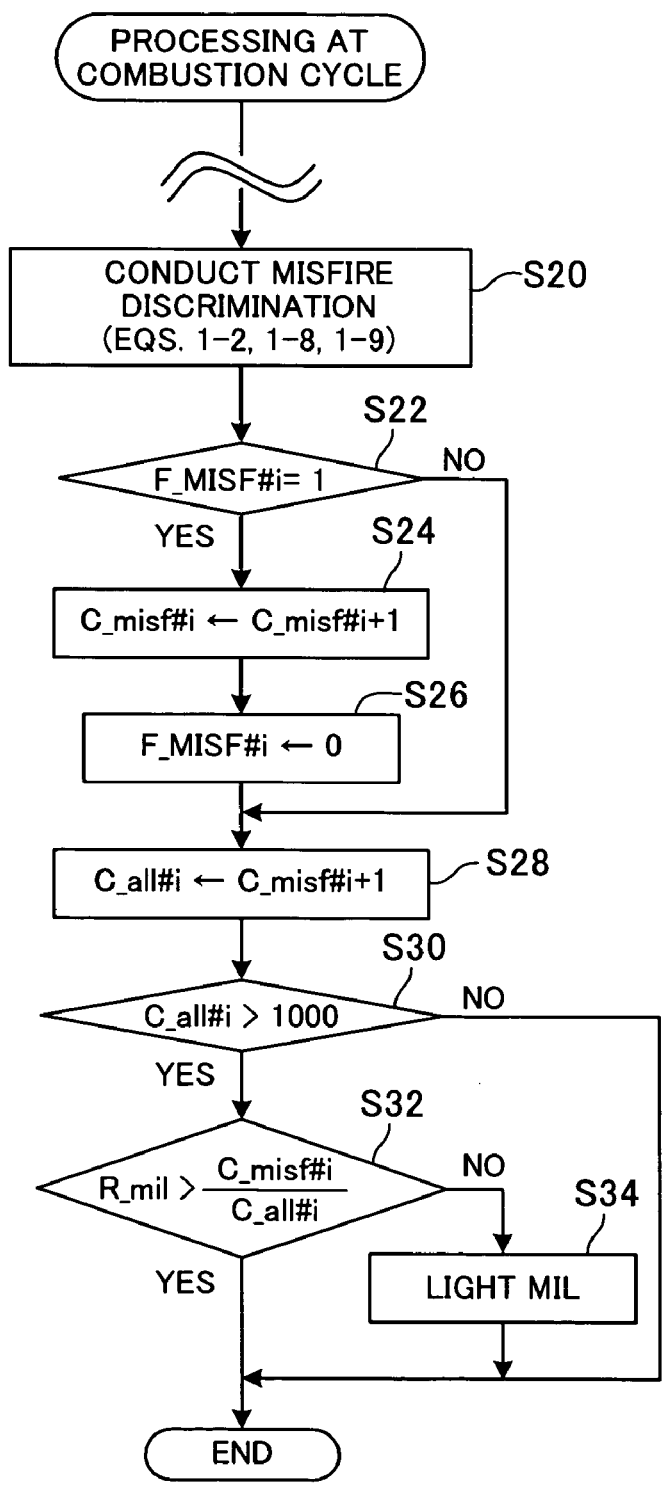
FIG. 11 is a flowchart showing the processing of misfire detection in the misfire detection operation executed by the ECU shown in FIG. 6.

FIGS. 10 and 11 are flowcharts showing operation routines executed by the system.

The routine shown in FIG. 10 is for calculating the correlation function Cr#i. It is executed every predetermined crank angle (15 degrees) for a different one of the cylinders in the order of cylinder #1, #3, #4, #2 (in the firing order). The routine shown in FIG. 11 is for performing misfire detection based on the calculated correlation functions Cr#i. It is executed every predetermined crank angle interval (every combustion cycle, i.e., crankangle of 720 degrees), in the same cylinder order.

The processing according to the routine of FIG. 10 will be explained first. In S10, the value of a crank synchronization cycle counter C_crk is incremented by 1, whereafter, in S12, it is checked whether the counter value exceeds 48. When the result in S12 is YES, the program goes to S14, in which the counter is reset to 0. This amounts to initializing the counter because the fact that the count value reached 47 means that the crank angle has reached 720 degrees. When the result in S12 is NO, S14 is skipped.

Next, in S16, the shown characteristics (basically the same as those in FIG. 7), which have been mapped and stored in the memory 80b, are retrieved based on the counter value (indicating the crank angle), the load condition of the engine 10 (specifically, the air intake quantity desired value; explained later) and the engine speed NE to calculate the reference period signal Fcyl#i for the cylinder concerned.

In other words, the reference period signal generator 800c further improves the misfire detection accuracy by changing or scheduling the reference period signal Fcyl#i in accordance with the engine load (shown in FIG. 7) and also changes it in accordance with the engine speed NE in order to compensate response lag (detection delay) of the crank angle sensor 60 with increasing engine speed NE.

Specifically, the reference period signal is determined or defined so that its maximum value increases and decreases in response to increasing and decreasing load. Moreover, since the absolute period of the response lag of the crank angle sensor 60 grows longer with increasing engine speed NE, the reference period signal is retarded with increasing engine speed NE.

Thus the reference period signal Fcyl#i is modified in accordance with the operating conditions of the engine 10. For the same purpose, it is also possible to change or schedule the discrimination threshold Cr_misf#i based on the same operation parameters.

Next, in S18, the crank angular velocity DNE and correlation function Cr#i are calculated in accordance with Equations 1-1 and 1-3.

The processing according to the routine of FIG. 11 will now be explained.

As mentioned above, the routine shown in FIG. 11 is executed every crank angle of 720 degrees, i.e., every combustion cycle of the cylinders i, and synchronously with the combustion timing of the cylinders i (e.g., at the TDC of the exhaust stroke). Taking cylinder #3 as an example, once ignition and combustion have proceeded through cylinders #3, #4, #2 and #1, the routine is then executed at the exhaust stroke TDC of cylinder #3. The routine is executed at the exhaust stroke because this enables the earliest detection of the combustion result in the cylinder concerned.

In S20, misfire discrimination is performed in accordance with Equations 1-2, 1-8 and 1-9. Specifically, the correlation function Cr#i is compared with the discrimination threshold value Cr_misf#i. When the correlation function is smaller than the discrimination threshold value, the bit of the flag F_MISF#i(k) is set to 1 in accordance with Equation 1-8. When the correlation function is equal to or greater than the discrimination threshold value, the bit of the flag is reset to 0 in accordance with Equation 1-9. This flag being set to 1 means that misfire occurred and its being reset to 0 means normal combustion (no misfire).

Next, in S22, it is determined whether the bit of the flag F_MISF#i is 1 (initial value). The flag F-MISF# is affixed with the cylinder number i because this determination is made for every cylinder. When the result in S22 is YES, i.e., when misfire is discriminated, the program goes to S24, in which a misfire number counter C_misf#i for counting the number of misfires of the cylinder concerned is incremented by 1, and then goes to S26, in which the flag F_MISF#i is reset to 0. When the result in S22 is NO, i.e., when it is discriminated that misfire does not occur, S24 and S26 are skipped.

Next, in S28, the value of a computation number counter C_all#i of the cylinder concerned is incremented by 1. Next, in S30, it is determined whether the value of the counter exceeds 1,000. When the result in S30 is YES, the program goes to S32, in which it is determined whether a misfire rate threshold value R_mil exceeds the quotient obtained by dividing the value of the misfire number counter C_misf#i by the value of the computation number counter C_all#i. The misfire rate threshold value R_mil is appropriately defined as, for example, 0.01%. This value is used for every cylinders in common.

The result in S32 being YES means that the misfire rate exceeds the threshold, i.e., that the misfire rate (i.e., percentage of number of misfires detected in 1,000 or more computations) does not exceed the threshold value, so that the program is terminated forthwith. The result in S32 being NO means that the misfire rate is equal to or greater than the misfire rate threshold, so the program goes to S34, in which the MIL 80e is lit.

When the result in S30 is NO, the remaining steps of the routine are skipped. This is for preventing the MIL 80e from being turned on erroneously when, for example, a few misfires have occurred at a time when the number of computations is small (less than 1,000).

Other operations performed by the ECU 80, namely, operations for controlling the engine 10, will now be explained.

Figure 12:
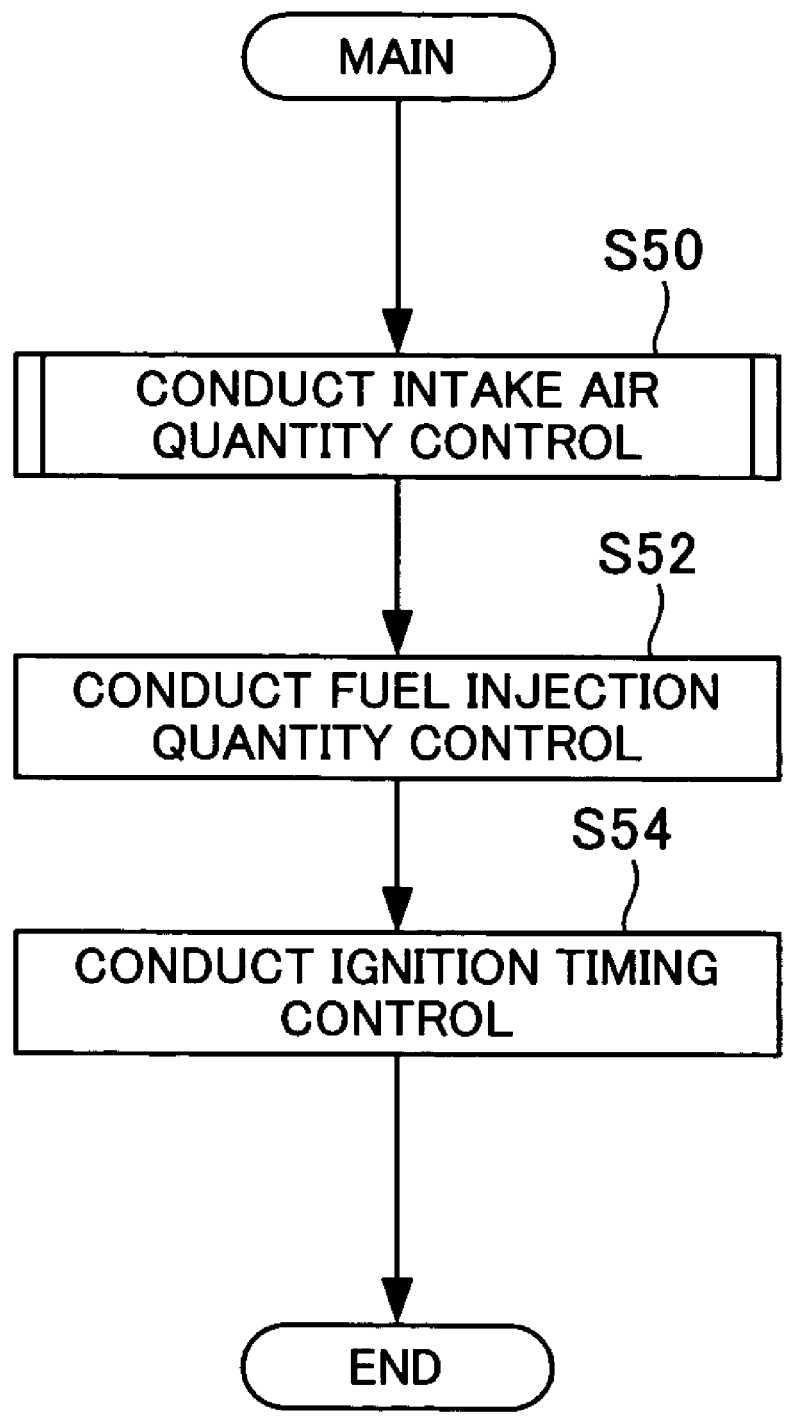
FIG. 12 is a flowchart showing the other operations, i.e., operations for controlling the engine, performed by the ECU shown in FIG. 1.

FIG. 12 is a flowchart showing a routine executed to perform these operations.

Intake air quantity control is conducted in S50. Specifically, the variable lift mechanism 40, variable phase mechanism 42 and variable compression ratio mechanism 44 are controlled based the operating conditions of the engine 10 detected from the sensor outputs and the air intake quantity of the engine 10 becomes optimum in light of the detected operating conditions. The processing performed in S50 is commenced with starting of the engine 10 and is thereafter executed at predetermined intervals of, say, 10 milliseconds. The processing of S52 and S54 is commenced with starting of the engine 10 and thereafter executed synchronously with TDC or a crankangle in the vicinity thereof.

Figure 13:
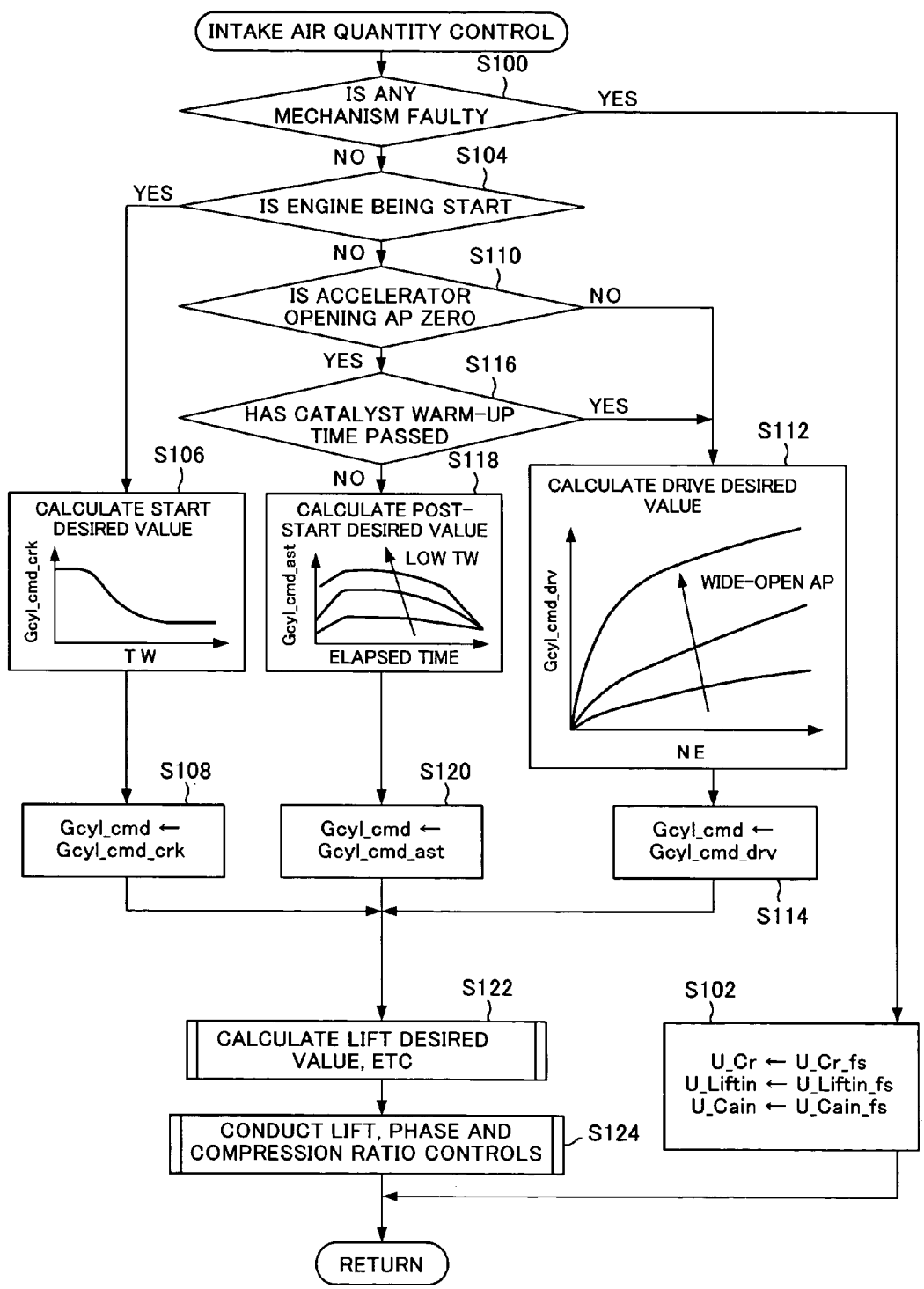
FIG. 13 is a subroutine flowchart showing the operation of intake air quantity control shown in the flowchart of FIG. 12.

FIG. 13 is a flowchart showing a subroutine executed to perform this processing.

In S100, it is determined whether any of three mechanisms, namely, the variable lift mechanism 40 and variable phase mechanism 42 of the valve mechanism, and the variable compression ratio mechanism 44, is faulty. When the result is YES, the program goes to S102, in which the command value U_Cr to be supplied to the variable compression ratio mechanism 44 is set at a fail command value U_Cr_fs for establishing the final compression ratio, the command value U_Liftin to be supplied to the variable lift mechanism 40 is set to a fail command value U_Liftin_fs of a level enabling vehicle creep, and the command value U_Cain to be supplied to the variable phase mechanism 42 is set at a fail command value U_Cain_fs that puts the phase in the retard direction (specifically 0 (zero current application)).

When the result in S100 is NO, the program goes to S104, in which it is determined whether the engine 10 is being started. This is determined by checking whether the detected engine speed NE is below the full-firing engine speed.

When the result in S104 is YES, the program goes to S106, in which the start desired value Gcyl_cmd_crk of the air intake quantity is calculated by retrieving the characteristic curve shown using the detected coolant temperature TW, whereafter the calculated value is defined as the intake air quantity desired value Gcyl_cmd in S108.

When the result in S104 is NO, the program goes to S110, in which it is determined whether the detected accelerator opening AP is zero, i.e., whether the accelerator pedal is released. When the result in S110 is NO, which can be taken to mean that the operator wants driving power, the program goes to S112, in which drive desired value Gcyl_cmd_drv of the intake air quantity is calculated by retrieving the characteristic curves shown using the detected engine speed NE and accelerator opening AP, whereafter the calculated value is defined as the intake air quantity desired value Gcyl_cmd in S114.

When the result in S110 is YES, which can be taken to mean that the engine 10 is idling, the program goes to S116, in which it is determined whether the warm-up time period of the catalytic converter 36 has elapsed. When the result in S116 is YES, the program goes to S112, in which the drive desired value of the intake air quantity is determined in the same manner as explained above. Since the accelerator opening AP is zero in this case, the drive desired value is a value farther to the low-load side, i.e., a smaller value, than when the result in S110 is YES.

When the result in S116 is NO, the program goes to S118, in which, in order to warm up the catalytic converter 36 faster, the post-start desired value Gcyl_cmd_ast of the air intake quantity is calculated by retrieving the characteristic curves shown using the time elapsed since the engine 10 was started and the detected coolant temperature TW, whereafter the calculated value is defined as the intake air quantity desired value Gcyl_cmd in S120. Execution of the subroutine shown in FIG. 13 is commenced with starting of the engine 10 and is thereafter executed every 10 milliseconds. The time elapsed from engine starting can therefore be determined from the number of subroutine loops executed.

Next, in S122, the compression ratio desired value, the lift desired value and the phase desired value, i.e., the desired values of the variable compression ratio mechanism 44, variable lift mechanism 40 and variable phase mechanism 42, are calculated.

Figure 14:
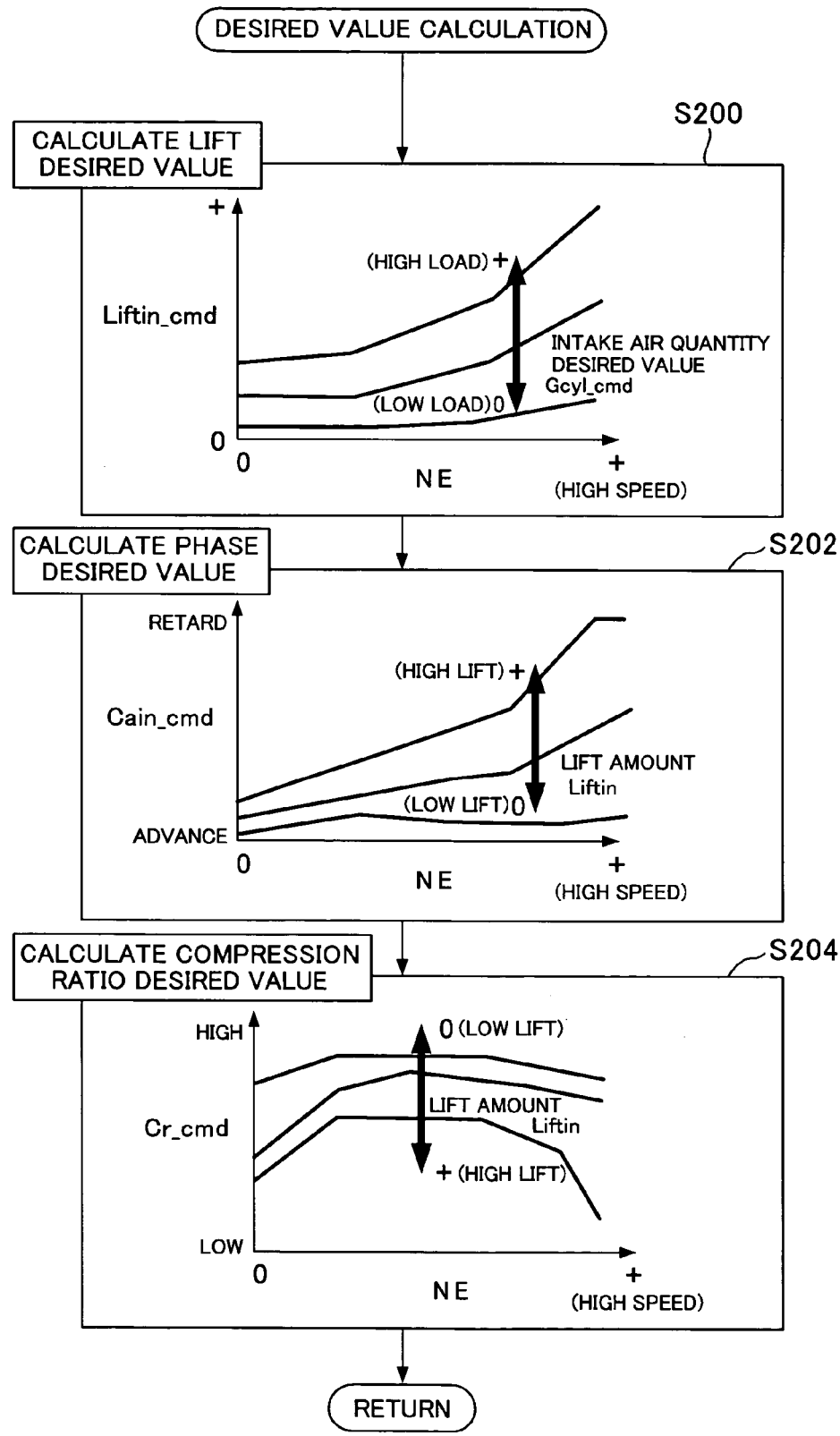
FIG. 14 is a subroutine flowchart showing the processing of calculating compression ratio desired value, lift desired value and phase desired value in the flowchart of FIG. 13.

FIG. 14 is a flowchart showing a subroutine executed to perform this processing.

First, in S200, the lift desired value Liftin_cmd is calculated by retrieving the characteristic curves shown using the detected engine speed NE and the calculated intake air quantity desired value Gcyl_cmd. The time period of the intake stroke of the engine 10 grows shorter with increasing desired air intake quantity, i.e., as the value moves toward the high-load side, and also with increasing engine speed NE, so that the lift desired value of the intake valves 20 needs to be increased to secure the required air intake quantity.

Next, in S202, the phase desired value Cain_cmd is calculated by retrieving the characteristic curves shown using the detected engine speed NE and detected actual lift Liftin. As shown, the phase desired value is defined here so that as the lift increases and the engine speed NE increases, the valve opening is increasingly retarded, i.e., the crank angle at which valve opening occurs is increasingly delayed.

This is to take advantage that the tendency for the flow rate produced in the intake air pipe during the intake stroke to be maintained also during the first half of the compressions stroke increases with increasing engine speed. In other words, the valve opening angle is retarded to keep the intake valves 20 open during the first half of the compression stroke so as to achieve higher charging efficiency.

The valve opening angle is advanced on the low-load side because at low load the air intake quantity can be finely controlled and efficiency can be further improved by increasing overlap to increase the internal EGR (Exhaust Gas Recirculation) quantity and reduce pumping loss.

Next, in S204, the compression ratio desired value Cr_cmd is calculated by retrieving the characteristic curves shown, again using the detected engine speed NE and the detected actual lift Liftin. The value of the compression ratio desired value is defined here to increase with decreasing actual lift. This is to improve combustion stability. The compression ratio desired value is set to a low value on the low-speed side. This is for reducing the scavenging effect on the low-speed side so as to increase the amount of residual exhaust gas in the cylinders 14 and thereby raise the air-fuel mixture temperature and for reducing flow in the cylinders so as to slow flame speed and thus avoid decrease in knock immunity. Further, the value of the compression ratio desired value is set low on the high-speed side. This is to reduce the amount of ignition timing retard for suppressing knock.

In S202 and S204, the compression ratio desired value is calculated by retrieval using the actual lift so as to avoid interference from the pistons 26 and the intake valves 20.

The explanation of the flowchart of FIG. 13 will be resumed.

Next, in S124, the compression ratio, lift and phase are controlled. In other words, the variable compression ratio mechanism 44, variable lift mechanism 40 and variable phase mechanism 42 are controlled using the aforesaid desired values.

Figure 15:
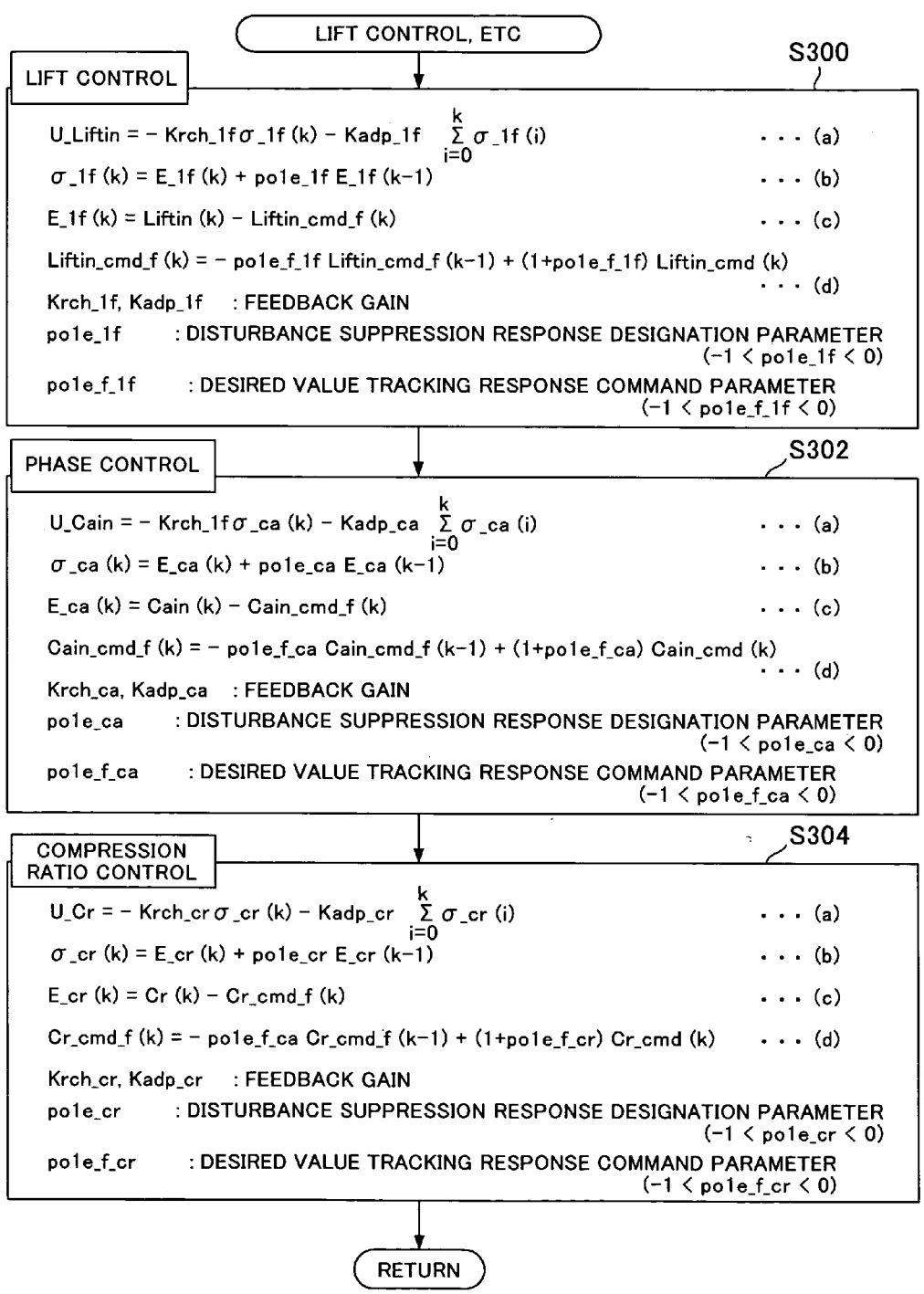
FIG. 15 is a subroutine flowchart showing the processing of performing compression ratio control, lift control and phase control in the flowchart of FIG. 13.

FIG. 15 is a flowchart showing a subroutine executed to perform this processing.

This control is conducted using simplified two-degree-of-freedom sliding mode control so as to prevent interference from the pistons 26 and intake valves 20 caused by overshooting of the desired values.

First, in S300, the lift command value (control input) U_Liftin is calculated based on the shown Equations (a) to (d).

Sliding mode control is response-directive control enabling designation of the controlled variable convergence rate. Two-degree-of-freedom sliding mode control is an extension of sliding mode control that permits the tracking rate with respect to the desired value of the controlled variable and the convergence rate of the controlled variable when disturbance is applied to be individually designated.

As indicated by Equation (d), the two-degree of freedom sliding mode control uses desired value tracking response command parameter pole_f_lf to calculate a filter value Lifttin_cmd_f(k) of the lift desired value in accordance with a first-order lag filter algorithm. The desired value tracking response command parameter pole_f_lf specifies the tracking rate with respect to the desired value of the controlled variable and, as shown, is set to a value greater than −1 and smaller than 0. The symbol (k) represents a sampling number (time) of the discrete-time system, more exactly, the execution time of the subroutine of FIG. 13.

Next, as indicated by Equation (c), the filter value Lifttin_cmd_f(k) of the lift desired value is subtracted from the lift detected value Liftin(k) to calculate error E_lf(k). Then, as indicated by Equation (b), the product obtained by multiplying the value of the error in the preceding cycle by a disturbance suppression response designation parameter pole_lf is added to the value of the error in the current cycle to calculate a switching function σ_lf(k). The disturbance suppression response designation parameter pole_lf specifies the convergence rate of the error E_lf when disturbance is applied. As shown in the drawing, it is set to a value greater than −1 and smaller than 0.

Next, as indicated by Equation (a), the product obtained by multiplying the integral of the switching function σ_lf(k) by a second feedback gain Kadp_lf is subtracted from the product obtained by multiplying the switching function σ_lf(k) by the negative value of a first feedback gain Krch_lf to calculate the lift command value (control input) U_Liftin.

In Equation (a), the first term on the left side is the reaching rule input for placing the quantity of state on the switching line and, as shown, is calculated as a proportional term of the switching function. The second term on the right side is an adaptive rule input for placing the quantity of state on the switching line while suppressing steady-state error. As shown, it is calculated as the integral term of the switching function. The first and second feedback gains are values defined by simulation, experimentation or the like.

Lift control is simultaneously performed by operating the motor 40d of the variable lift mechanism 40 based on the calculated lift command value.

Next, in S302, the phase command value (control input) U_Cain is calculated in accordance with the same Equations (a) to (d), the amount of energizing current to be supplied to the electromagnetic brake 42b of the variable phase mechanism 42 is calculated based on the calculated phase command value, and the electromagnetic brake 42b is operated to perform variable phase control.

Next, in S304, the compression ratio command value (control input) U_Cr is calculated in accordance with the same Equations (a) to (d) and the hydraulic mechanism 44e of the variable compression ratio mechanism 44 is operated based on the calculated compression ratio command value to perform compression ratio control.

The calculations of the command values in S302 and S304 are not explained in detail here because they are done in the same way as the calculation in S300, other than for the difference in the subscripts.

The explanation of the routine of FIG. 12 will be resumed.

Next, in S52, fuel injection control is performed. Specifically, a fuel injection quantity that will result in the theoretical air/fuel ratio is calculated by retrieving a predefined characteristic curve using the calculated intake air quantity desired value Gcyl_cmd and the detected accelerator opening AP, and the injectors 16 are driven to inject fuel in the so-determined quantity.

Next, in S54, ignition timing control is performed. The ignition timing control is conducted by first retrieving a reference ignition timing from a predetermined characteristic curve using the detected engine speed NE and the intake air quantity desired value Gcyl_cmd calculated earlier and then determining the ignition timing by correcting the so-retrieved reference ignition timing in light of other engine operating conditions.

Misfire detection was simulated using the configuration of FIG. 6 under the conditions shown in FIG. 16. The results are shown in FIGS. 17 to 21 and summarized in the following.

Case 1

Figure 17:
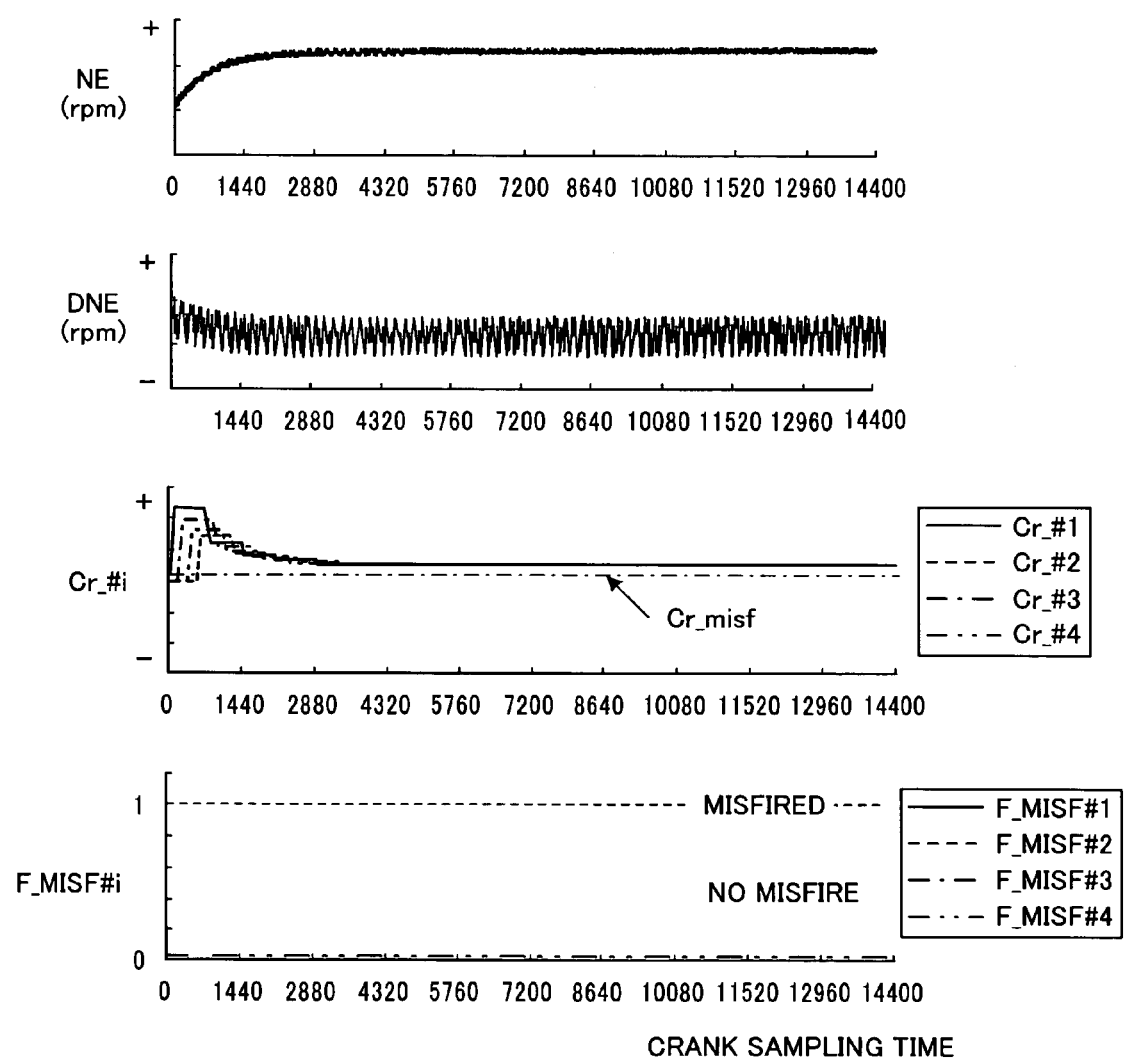
FIG. 17 is a set of graphs showing results of simulations of the misfire detection conducted under the conditions shown in FIG. 16 in the case of using the configuration shown in FIG. 6.

Misfire did not occur and no torque deviation arose among the cylinders. As shown in FIG. 17, it was possible under these conditions to detect or discriminate that no cylinder misfired.

Case 2

Figure 18:
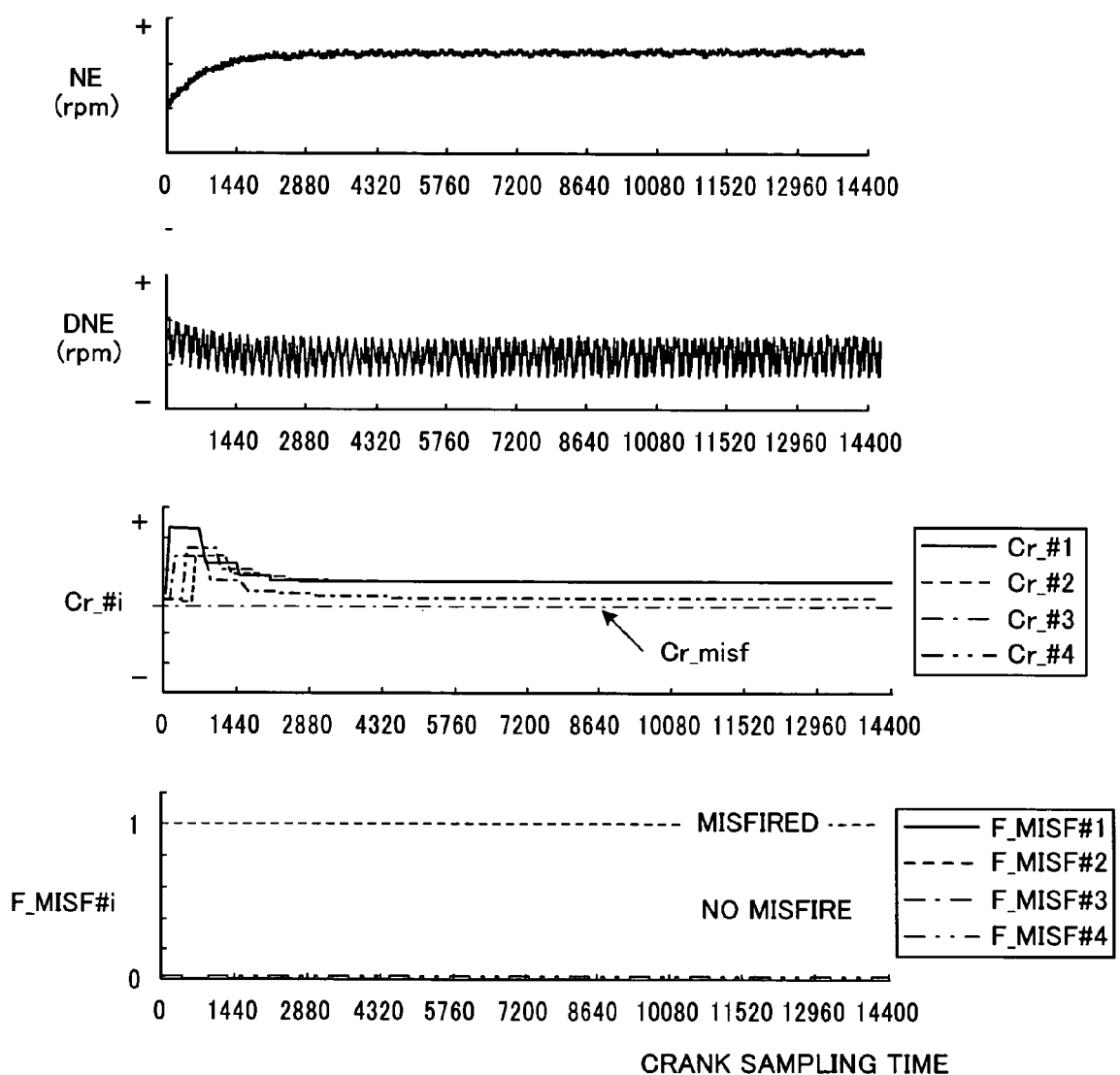
FIG. 18 is a set of graphs similarly showing results of simulation of the misfire detection conducted under the conditions shown in FIG. 16 in the case of using the configuration shown in FIG. 6.

No misfire occurred and the torque of cylinder #3 was 20% lower than that of the other cylinders. As shown in FIG. 18, it was possible under these conditions to avoid detection or discrimination of misfire in cylinder #3 and to detect or discriminate that misfire did not occur in any cylinder.

Case 3

Figure 19:
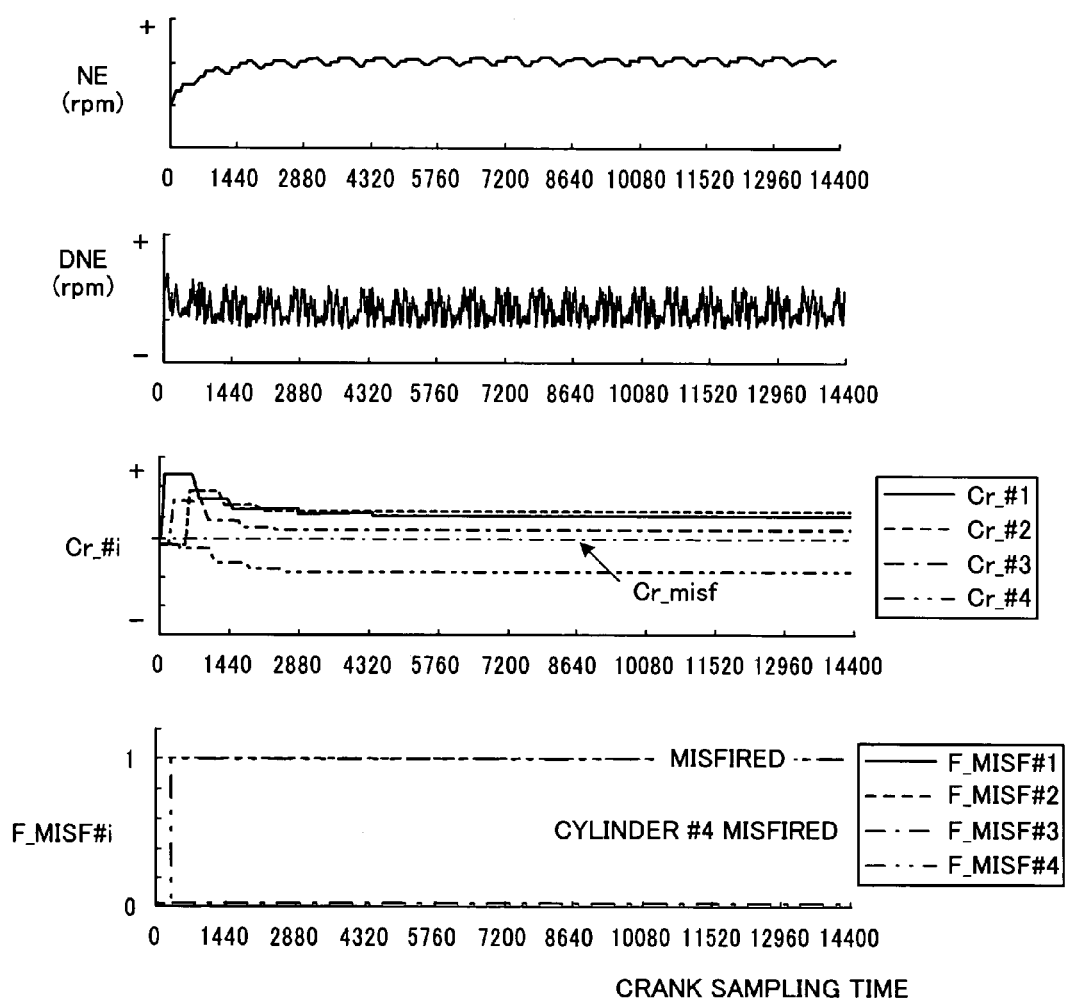
FIG. 19 is a set of graphs similarly showing results of simulation of the misfire detection conducted under the conditions shown in FIG. 16 in the case of using the configuration shown in FIG. 6.

The torque of cylinder #3 was 20% lower than that of cylinders #1 and #2, and cylinder # 4 misfired. As shown in FIG. 19, it was possible under these conditions (single-cylinder misfire) to detect or discriminate that misfire occurred in cylinder #4 and did not occur in the other cylinders.

Case 4

Figure 20:
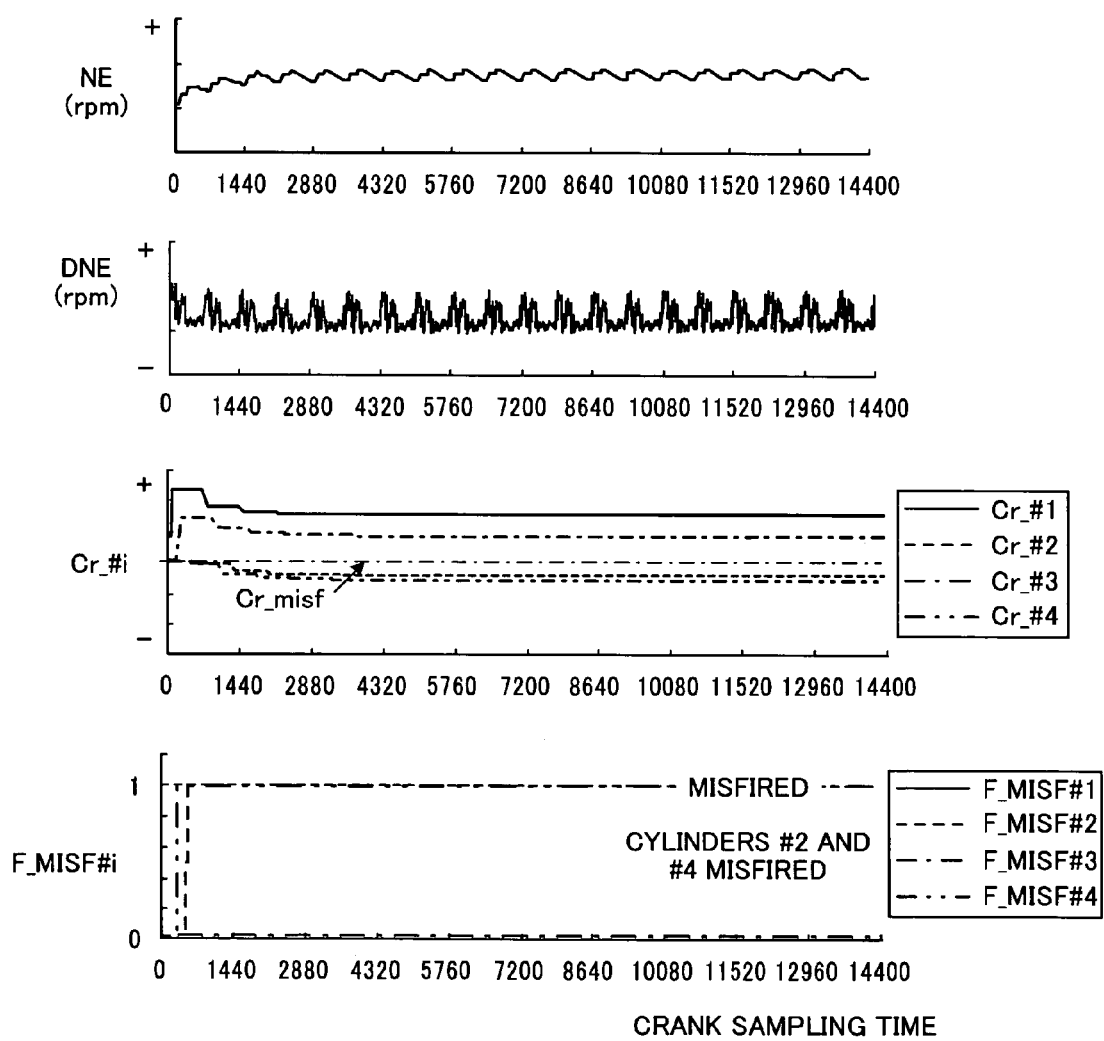
FIG. 20 is a set of graphs similarly showing results of simulation of the misfire detection conducted under the conditions shown in FIG. 16 in the case of using the configuration shown in FIG. 6.

The torque of cylinder #3 was 20% lower than that of cylinder #1, and cylinders #2 and # 4 misfired. As shown in FIG. 20, it was possible under these conditions (successive two-cylinder misfire) to detect or discriminate that misfire occurred in cylinders #2 and #4 and did not occur in cylinders #1 and #3.

Case 5

Figure 21:
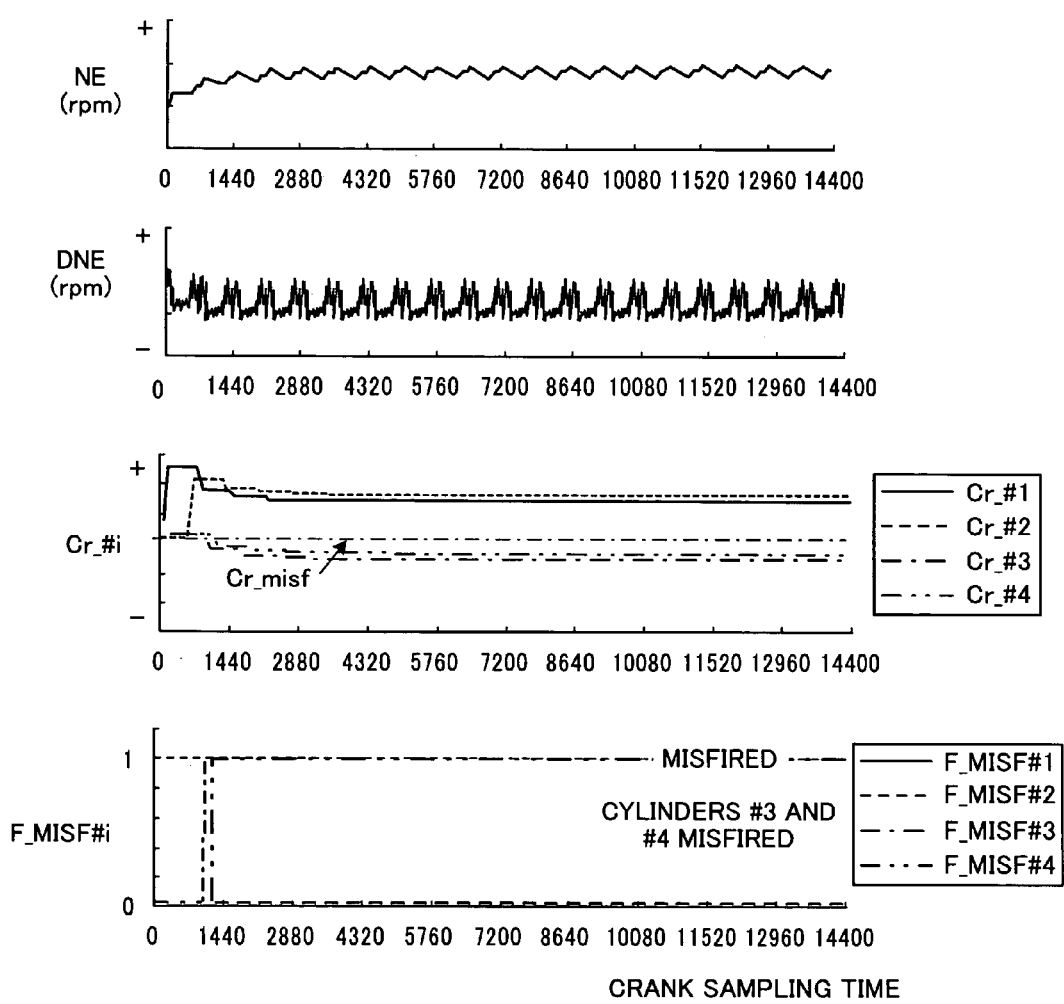
FIG. 21 is a set of graphs similarly showing results of simulation of the misfire detection conducted under the conditions shown in FIG. 16 in the case of using the configuration shown in FIG. 6.

Combustion was normal in cylinders #1 and #2, and misfire occurred in cylinders #3 and #4. As shown in FIG. 21, it was possible under these conditions (opposed two-cylinder misfire) to detect or discriminate that misfire occurred in cylinders #3 and #4 and did not occur in cylinders #1 and #2.

As explained in the foregoing, the misfire detection system according to this embodiment calculates at every predetermined crank angle the product obtained by multiplying the value derived from the periodic function Fcyl#i defined to model the torque generation of the individual cylinders synchronously with each combustion cycle by the detected crank angular velocity, integrates the calculated product over the predetermined crank angle interval, calculates the moving average value of the result, thereby defining the correlation function Cr#i, and compares the correlation function Cr#i with the discrimination threshold to detect misfire. Owing to this configuration, the misfire detection system can detect misfire with good accuracy and can identify the misfiring cylinders with good accuracy, even when misfire occurs successively in the multiple cylinder engine.

In other words, although the torque variation owing to combustion and the crank angular velocity are correlated, misfire can be detected based on this correlation by calculating the product obtained by multiplying the value derived from the periodic function defined to model the torque generation of the individual cylinders over the combustion cycle by the crank angular velocity. Further, by calculating the integral of the product over the predetermined crank angle interval and calculating the moving average of the result, it is possible to calculate the correlation function as a constant value removed of frequency components. Therefore, by comparing the calculated integral value with the discrimination threshold, it is possible to detect misfire with good accuracy and to identify the misfiring cylinders with good accuracy, even when misfire occurs successively in a four-cylinder engine.

Moreover, since the correlation function Cr#i used for misfire discrimination can be calculated not as an periodically fluctuating value but as a constant value, the computations can be simplified because processing for removing frequency components, such as a peak holding, absolute value computation and averaging, is made unnecessary.

The embodiment is thus configured to have a system for detecting a misfire of an internal combustion engine (10) having a plurality of cylinders (14), comprising: a crank angle sensor (60, 80, 800a) detecting a crank angle velocity (DNE) at every predetermined crank angle (crank angle of 15 degrees); a calculator calculating (80, 800b, 800c, S10 to S18) a product at the every predetermined crank angle by multiplying a value (Fcyl#i) retrieved from a periodic function (reference period signal) defined to model torque generation of individual cylinders (i) synchronously with each combustion cycle (e.g., crank angle of 720 degrees), by the detected crank angle velocity, and integrating the calculated product over a predetermined interval (crank angle of 720 degrees) to calculate an integral of the product (Cr#i); and a misfire discriminator (80, 800d, S20 to S34) comparing the calculated integral (Cr#i) with a predetermined value (Cr_misf) and detecting whether misfire has occurred in one of the individual cylinders based on a result of the comparison.

In the system, the predetermined interval is an integer of the combustion cycle.

In the system, the periodic function is set in response to operating condition of the engine.

In the system, the periodic function is set in response to load (desired value of intake air quantity Gcyl_cmd) and speed of the engine (NE).

In the system, the calculator calculates the integral by integrating the calculated product over the predetermined interval and by calculating its moving average.

In the system, the misfire discriminator counts a number (C_misfj#i) that the calculated integral (Cr#i) is smaller than the predetermined value (Cr_misf) for each of the individual cylinders (S20 to S28) and detects misfire has occurred in the cylinder whose counted number exceeds a prescribed value (R_mil)(S30 to S34).

Although the high-pass filter 800a is used in the configuration of FIG. 6, a discrete-time Fourier transform unit or a wavelet converter can be used instead.

Although in the foregoing description the air intake quantity desired value is used as a parameter indicating the load of the engine 10, this is not a limitation and it is possible instead to use any of various other parameters indicating the load of the engine 10.

Although it is explained in the foregoing that simplified sliding mode control is used for air intake quantity calculation and the like, it is possible instead to use some other type of sliding mode control or to use some other control algorithm such as adaptive control or PID control.

Japanese Patent Application No. 2004-381322 filed on Dec. 28, 2004 is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for detecting a misfire of an internal combustion engine having a plurality of cylinders, comprising:

a crank angle sensor detecting a crank angle velocity at every predetermined crank angle;

a calculator calculating a product at the every predetermined crank angle by multiplying a value retrieved from a periodic function defined to model torque generation of individual cylinders synchronously with each combustion cycle, by the detected crank angle velocity, and integrating the calculated product over a predetermined interval to calculate an integral of the product; and a misfire discriminator comparing the calculated integral with a predetermined value and detecting whether misfire has occurred in one of the individual cylinders based on a result of the comparison.

2. The system according to claim 1, wherein the predetermined interval is an integer of the combustion cycle.

3. The system according to claim 1, wherein the periodic function is set in response to operating condition of the engine.

4. The system according to claim 3, wherein the periodic function is set in response to load and speed of the engine.

5. The system according to claim 1, wherein the calculator calculates the integral by integrating the calculated product over the predetermined interval and by calculating its moving average.

6. The system according to claim 1, wherein the misfire discriminator counts a number that the calculated integral is smaller than the predetermined value for each of the individual cylinders and detects misfire has occurred in the cylinder whose counted number exceeds a prescribed value.

7. A method of detecting a misfire of an internal combustion engine having a plurality of cylinders, comprising the steps of:

(a) detecting a crank angle velocity at every predetermined crank angle;

(b) calculating a product at the every predetermined crank angle by multiplying a value retrieved from a periodic function defined to model torque generation of individual cylinders synchronously with each combustion cycle, by the detected crank angle velocity, and integrating the calculated product over a predetermined interval to calculate an integral of the product; and (c) comparing the calculated integral with a predetermined value and detecting whether misfire has occurred in one of the individual cylinders based on a result of the comparison.

8. The method according to claim 7, wherein the predetermined interval is an integer of the combustion cycle.

9. The method according to claim 7, wherein the periodic function is set in response to operating condition of the engine.

10. The method according to claim 9, wherein the periodic function is set in response to load and speed of the engine.

11. The method according to claim 7, wherein the step (b) calculates the integral by integrating the calculated product over the predetermined interval and by calculating its moving average.

12. The method according to claim 7, wherein the step (c) counts a number that the calculated integral is smaller than the predetermined value for each of the individual cylinders and detects misfire has occurred in the cylinder whose counted number exceeds a prescribed value.

* * * * *